(12) United States Patent
Moore et al.

(10) Patent No.: US 7,084,854 B1
(45) Date of Patent: Aug. 1, 2006

(54) ACTUATOR FOR PROVIDING TACTILE SENSATIONS AND DEVICE FOR DIRECTIONAL TACTILE SENSATIONS

(75) Inventors: David F. Moore, San Carlos, CA (US); Erik J. Shahoian, San Ramon, CA (US); Bruce M. Schena, Menlo Park, CA (US)

(73) Assignee: Immersion Corporation, San Jose, CA (US)

( * ) Notice: Subject to any disclaimer, the term of this patent is extended or adjusted under 35 U.S.C. 154(b) by 310 days.

(21) Appl. No.: 09/967,494

(22) Filed: Sep. 27, 2001

Related U.S. Application Data

(60) Provisional application No. 60/236,417, filed on Sep. 28, 2000.

(51) Int. Cl.
*G09G 5/08* (2006.01)

(52) U.S. Cl. .................. 345/157; 345/701; 345/156; 463/30

(58) Field of Classification Search ................ 345/156, 345/157, 161, 163, 167, 701, 702; 463/36, 463/37, 38, 30
See application file for complete search history.

(56) References Cited

U.S. PATENT DOCUMENTS

| | | | |
|---|---|---|---|
| 2,832,073 | A | 4/1958 | Arkus et al. |
| 3,157,853 | A | 11/1964 | Hirsch |
| 3,220,121 | A | 11/1965 | Culter |
| 3,497,668 | A | 2/1970 | Hirsch |
| 3,517,446 | A | 6/1970 | Corlyon et al. |
| 3,623,064 | A | 11/1971 | Kagan |
| 3,902,687 | A | 9/1975 | Hightower |
| 3,903,614 | A | 9/1975 | Diamond et al. |
| 3,911,416 | A | 10/1975 | Feder |
| 4,160,508 | A | 7/1979 | Salisbury et al. |
| 4,236,325 | A | 12/1980 | Hall et al. |
| 4,513,235 | A | 4/1985 | Acklam et al. |
| 4,581,491 | A | 4/1986 | Boothroyd |
| 4,599,070 | A | 7/1986 | Hladky et al. |
| 4,708,656 | A | 11/1987 | de Vries et al. |
| 4,713,007 | A | 12/1987 | Alban |
| 4,794,392 | A | 12/1988 | Selinko |
| 4,891,764 | A | 1/1990 | McIntosh |
| 4,930,770 | A | 6/1990 | Baker |
| 4,934,694 | A | 6/1990 | McIntosh |
| 5,019,761 | A | 5/1991 | Kraft |
| 5,022,407 | A | 6/1991 | Horch et al. |

(Continued)

FOREIGN PATENT DOCUMENTS

EP 0 349 086 A1 1/1990

OTHER PUBLICATIONS

Baigrie, "Electric Control Loading—A Low Cost, High Performance Alternative," *Proceedings of Interservice/Industry Training Systems Conference*, pp. 247–254, Nov. 6–8, 1990.

Iwata, "Pen–based Haptic Virtual Environment," 0–7803–1363–1/93 IEEE, pp. 287–292, 1993.

(Continued)

*Primary Examiner*—Kent Chang
(74) *Attorney, Agent, or Firm*—Thelen Reid & Priest LLP; David B. Ritchie

(57) ABSTRACT

An interface device providing haptic feedback to a user is in communication with a host computer. The device includes a housing, at least one sensor for detecting user input, and an actuator assembly. The actuator assembly includes a grounded flexure suspension coupled to an inertial mass which moves when the actuator assembly is energized to cause inertial sensations. The inertial mass includes a pole piece surrounding a magnet, and a grounded coil between magnet and pole piece causes the motion of the inertial mass when current is flowed therethrough. Another embodiment provides directional haptic feedback to a user and includes at least two actuator assemblies oriented such that the inertial masses oscillate substantially orthogonally, and can be controlled to output the inertial sensations approximately along a single axis having a desired orientation.

31 Claims, 16 Drawing Sheets

U.S. PATENT DOCUMENTS

| | | | |
|---|---|---|---|
| 5,035,242 | A | 7/1991 | Franklin et al. |
| 5,038,089 | A | 8/1991 | Szakaly |
| 5,078,152 | A | 1/1992 | Bond et al. |
| 5,212,473 | A | 5/1993 | Louis |
| 5,240,417 | A | 8/1993 | Smithson et al. |
| 5,271,290 | A | 12/1993 | Fischer |
| 5,275,174 | A | 1/1994 | Cook |
| 5,299,810 | A | 4/1994 | Pierce et al. |
| 5,309,140 | A | 5/1994 | Everett, Jr. et al. |
| 5,334,027 | A | 8/1994 | Wherlock |
| 5,466,213 | A | 11/1995 | Hogan et al. |
| 5,547,382 | A | 8/1996 | Yamasaki et al. |
| 5,766,016 | A | 6/1998 | Sinclair et al. |
| 5,785,630 | A | 7/1998 | Bobick et al. |
| 5,790,108 | A * | 8/1998 | Salcudean et al. .......... 345/184 |
| 6,088,019 | A * | 7/2000 | Rosenberg ................... 345/156 |
| 6,211,861 | B1 * | 4/2001 | Rosenberg et al. ......... 345/163 |
| 6,219,034 | B1 | 4/2001 | Elbing et al. |
| 6,437,770 | B1 | 8/2002 | Venema et al. |
| 2002/0024501 | A1 | 2/2002 | Shalit |

OTHER PUBLICATIONS

Russo, "The Design and Implementation of a Three Degree of Freedom Force Output Joystick," *MIT Libraries Archives* pp. 1–131, May 1990, archived Aug. 14, 1990.

Brooks et al., "Hand Controllers for Teleoperation—A State–of–the–Art Technology Survey and Evaluation," *JPL Publication 85–11*, NASA–CR–175890; N85–28559, pp. 1–84, Mar. 1, 1985.

Jones et al., "A perceptual analysis of stiffness," ISSN 0014–4819 Springer International (Springer–Verlag); *Experimental Brain Research*, vol. 79, No. 1, pp. 150–156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25–44, May 2, 1993.

Snow et al., Model–X Force–Reflecting–Hand–Controller, NT Control No. NPO–17851; JPL Case No. 7348, pp. 1–4 with 45 pages of attachmentsa, Jun. 15, 1989.

Ouh–Young, "Force Display in Molecular Docking," Doctoral Dissertation, University of North Carolina at Chaple Hill, UMI Order No. 9034744, p. 1–369, 1990.

Tadros, "Control System Design for a Three Degree of Freedom Virtual Environment Simulator Using Motor/Brake Pair Actuators," *MIT Archive*, pp. 1–88, Feb. 1990, archived Aug. 13, 1990.

Caldwell et al., "Enhanced Tactile Feedback (Tele–Taction) Using a Multi–Functional Sensory System," 1050–4729/93, pp. 955–960, 1993.

Adelstein et al., Design and Implementation of a Force Reflecting Manipulandum for Manual Control research, DSC–vol. 42, *Advances in Robotics*, pp. 1–12, 1992.

Gotow et al., "Controlled Impedance Test Apparatus for Studying Human Interpretation of Kinesthetic Feedback," WA11–11:00, pp. 332–337.

Stanley et al., "Computer Simulation of Interacting Dynamic Mechanical Systems Using Distributed Memory Parallel Processors," DSC–vol. 42, *Advances in Robotics*, pp. 55–61, ASME 1992.

Russo, "Controlling Dissipative Magnetic Particle Brakes in Force Reflective Devices," DSC–vol. 42, *Advances in Robotics*, pp. 63–70, ASME 1992.

Kontarinis et al., "Display of High–Frequency Tactile Information to Teleoperators," *Telemanipulator Technology and Space Telerobotics*, Won S. Kim, Editor, Proc. SPIE vol. 2057, pp. 40–50, Sep. 7–9, 1993.

Patrick et al., "Design and Testing of A Non–reactive, Fingertip, Tactile Display for Interaction with Remote Environments," *Cooperative Intelligent Robotics in Space*, Rui J. deFigueiredo et al, Editor, Proc. SPIE vol. 1387, pp. 215–222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man–Machine Interface for Advanced Teleoperation," *Science*, vol. 208, No. 4450, pp. 1327–1335, 1980.

Bejczy et al., "Generalization of Bilateral Force–Reflecting Control of Manipulators," *Proceedings Of Fourth CISM–IFToMM*, Sep. 8–12, 1981.

McAffee et al., "Teleoperator Subsystem/Telerobot Demonstrator: Force Reflecting Hand Controller Equipment Manual," *JPL* 1988, JPL D–5172.

Minsky, "Computational Haptics: The Sandpaper System for Synthesizing Texture for a Force–Feedback Display," *Ph.D. Dissertation*, MIT, Jun. 1995, archived Jul. 6, 1995.

Jacobsen et al., "High Performance Dextrous Telerobotic Manipulator With Force Reflection," *Intervention/ROV '91 Conference & Exposition*, Hollywood, Florida, May 21–23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30–Oct. 1, 1992.

IBM Technical Disclosure Bulletin, "Mouse Ball–Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire*, Mar. 10–11, 1988.

Howe, "A Force–Relating Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf–blind individuals," *IEEE Virtual Reality Annual International Symposium*, Seattle, WA, Sep. 18–22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12–15, 1980.

Bejczy et al., "A Laboratory Breadboard System For Dual–Arm Teleoperation," *SOAR '89 Workshop, JSC*, Houston, TX, Jul. 25–27, 1989.

Ouhyoung et al., "A Low–Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8–11, 1994.

Bejczy, et al., "Universal Computer Control System (UCCS) For Space Telerobots," CH2413–3/87/0000/0318501.00 1987 IEEE, 1987.

* cited by examiner

ACTUATOR FOR PROVIDING TACTILE SENSATIONS AND DEVICE FOR DIRECTIONAL TACTILE SENSATIONS

CROSS REFERENCE TO RELATED APPLICATIONS

This application claims the benefit of U.S. Provisional Application No. 60/236,417, filed Sep. 28, 2000, and entitled, "Providing Directional Tactile Feedback and Actuator for Providing Tactile Sensations", which is incorporated herein by reference in its entirety.

BACKGROUND OF THE INVENTION

The present invention relates generally to interface devices for allowing humans to interface with computer systems, and more particularly to computer interface devices that allow the user to provide input to computer systems and allow computer systems to provide haptic feedback to the user.

A user can interact with an environment displayed by a computer to perform functions and tasks on the computer, such as playing a game, experiencing a simulation or virtual reality environment, using a computer aided design system, operating a graphical user interface (GUI), etc. Common human-computer interface devices used for such interaction include a mouse, joystick, trackball, steering wheel, stylus, tablet, pressure-sensitive sphere, or the like, that is connected to the computer system controlling the displayed environment. Typically, the computer updates the environment in response to the user's manipulation of a physical manipulandum such as a joystick handle or mouse, and provides visual and audio feedback to the user utilizing the display screen and audio speakers. The computer senses the user's manipulation of the user manipulandum through sensors provided on the interface device that send locative signals to the computer. For example, the computer displays a cursor or other graphical object in a graphical environment, where the location of the cursor is responsive to the motion of the user manipulandum.

In some interface devices, force feedback or tactile feedback is also provided to the user, more generally known herein as "haptic feedback." These types of interface devices can provide physical sensations which are felt by the user manipulating a user manipulandum of the interface device. One or more motors or other actuators are coupled to the joystick, mouse, or other device and are connected to the controlling computer system. In kinesthetic force feedback systems, the computer system controls forces on the movement of the joystick or mouse in conjunction and coordinated with displayed events and interactions by sending control signals or commands to the actuators. For example, the Logitech Wingman Force Feedback Mouse allows a user to experience force sensations associated with interacting a cursor with graphical objects in a GUI or web page.

Many low-cost haptic devices provide inertially-grounded tactile feedback, in which forces are transmitted to a housing or portion thereof with respect to an inertial mass and felt by the user, rather than kinesthetic feedback, in which forces are output directly in the degrees of freedom of motion of the interface device with respect to a physical (earth) ground. For example, many currently-available gamepad controllers include a spinning motor with an eccentric mass, which outputs force sensations to the housing of the controller in coordination with events occurring in a game. In some haptic mouse devices, pins, buttons, or the housing of the mouse can be actuated in accordance with interaction of a controlled cursor with other graphical objects, which the user feels by touching those housing areas.

One problem with such inexpensive haptic controllers is their limited ability to convey different types of force sensations to the user. A device that provides more flexibility in tuning and adjusting the feel of haptic sensations is more desirable. In addition, inertial controllers currently available can only provide output pulses and vibrations in the general directions of the rotating mass. The sensations thus feel to the user as if they are not output in any particular direction, but are simply output on the housing of the device. However, many events in games and other computer-implemented environments are direction-based. However, the inertial haptic devices currently available do not allow such directional output of vibrations.

SUMMARY OF THE INVENTION

The present invention is directed toward providing a low-cost actuator and directional haptic feedback for a haptic feedback interface device.

More particularly, an interface device of the present invention providing haptic feedback to a user and is in communication with a host computer. The device includes a housing, e.g. a handheld housing or a mouse housing movable in planar degrees of freedom, at least one sensor for detecting user input, and an actuator assembly. The actuator assembly includes a grounded flexure suspension and an inertial mass coupled thereto, said inertial mass moving when the actuator assembly is energized to cause inertial sensations the housing. The inertial mass includes a pole piece surrounding a magnet, and a grounded coil is positioned between the magnet and the pole piece and causes the motion of the inertial mass when current is flowed therethrough, and the flexure suspension biases the inertial mass to an original position. In some embodiments, the flexure suspension includes an inner ring and an outer ring, one of the rings grounded to the housing, the other ring coupled to and moving with the inertial mass. The inner ring can be coupled to the outer ring by at least one flexible member.

In another aspect of the present invention, an interface device provides directional haptic feedback to a user and is in communication with a host processor. The device includes a housing physically contacted by the user, at least one sensor for detecting user input, and at least two actuator assemblies coupled to the housing. Each of the actuator assemblies includes a grounded flexure suspension and an inertial mass coupled to the flexure suspension that oscillates linearly. The actuator assemblies are oriented such that the inertial masses oscillate substantially orthogonally to each other when the actuator assemblies are energized to cause inertial sensations on the housing, wherein the output of the actuator assemblies can be controlled to output the inertial sensations approximately along a single axis having a desired orientation. Each of the actuator assemblies can be harmonically controlled by a separate control signal. A method of the present invention similarly outputs directional inertial sensations.

The present invention advantageously provides a device including a low-cost actuator that provides tactile feedback sensations for a tactile feedback device using low cost actuators and tunable components such as a low-cost flexure suspension. The present invention also provides directional tactile sensations, which allow for a much greater variety of sensations in tactile devices, e.g. allowing the experience of playing a game or interacting with other types of computer applications to be more fulfilling for the user.

These and other advantages of the present invention will become apparent to those skilled in the art upon a reading of the following specification of the invention and a study of the several figures of the drawing.

DETAILED DESCRIPTION OF PREFERRED EMBODIMENTS

The present invention is addressed to inertial haptic feedback in interface devices. A mouse and a gamepad, described below in FIGS. 1a and 1b, are just two of the possible interface devices that can be used with the present invention.

Figure 1A:
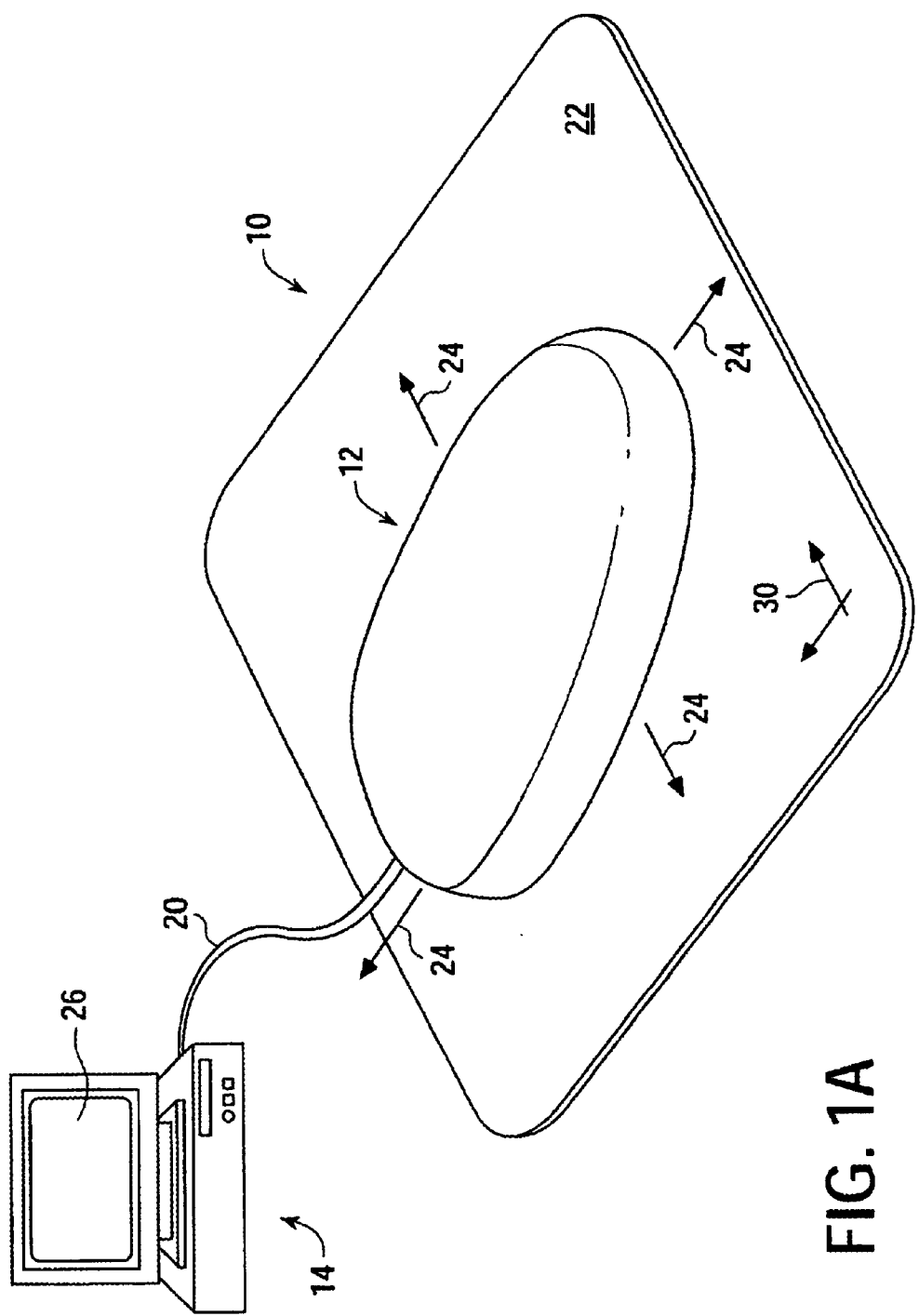
FIG. 1a is a perspective view of a haptic feedback mouse interface system suitable for use with the present invention.
Figure 1B:
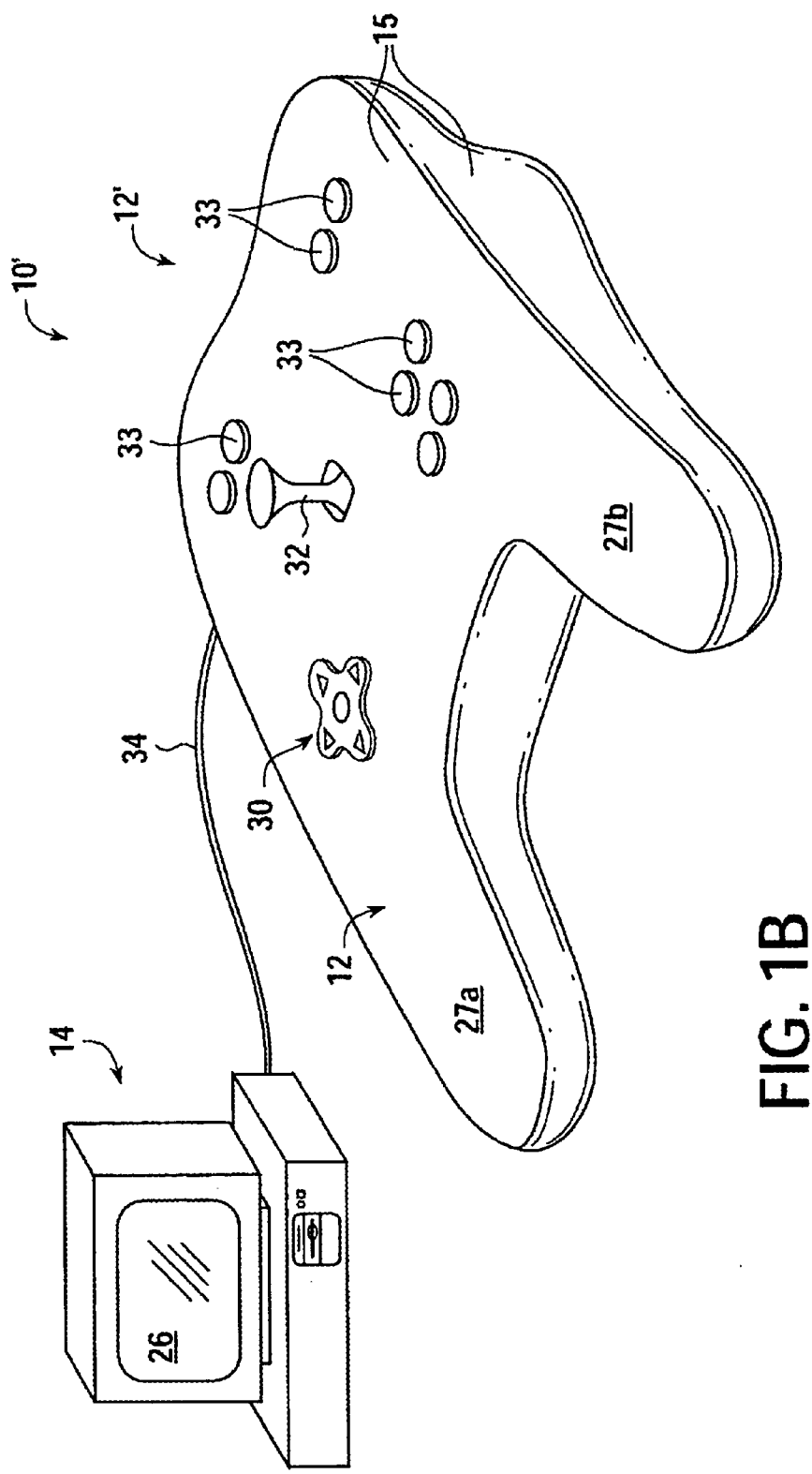
FIG. 1b is a perspective view of a haptic feedback gamepad interface system suitable for use with the present invention.

FIG. 1a is a perspective view of a haptic feedback mouse interface system 10 suitable for use with the present invention and capable of providing input to a host computer based on the user's manipulation of the mouse and capable of providing haptic feedback to the user of the mouse system based on events occurring in a program implemented by the host computer. Mouse system 10 includes a mouse 12 and a host computer 14. It should be noted that the term "mouse" as used herein, indicates an object generally shaped to be grasped or contacted from above and moved within a substantially planar workspace (and additional degrees of freedom if available). Typically, a mouse is a smooth or angular shaped compact unit that snugly fits under a user's hand, fingers, and/or palm, but can also be implemented as a grip, finger cradle, cylinder, sphere, planar object, etc.

Mouse 12 is an object that is preferably grasped, gripped or otherwise contacted and is manipulated by a user. For example, a user can move mouse 12 to provide planar two-dimensional input to a computer system to correspondingly move a computer generated graphical object, or to control a virtual character, vehicle, or other entity in a game or simulation. In addition, mouse 12 can include one or more buttons to allow the user to provide additional commands to the computer system. In some embodiments, the top portion of the mouse housing can be tilted or pivoted to provide additional commands to the host computer, similarly to a button.

Mouse 12 preferably includes an actuator assembly which is operative to produce forces on the mouse 12. This operation is described in greater detail below with reference to FIG. 2.

Mouse 12 rests on a ground surface 22 such as a tabletop or mousepad. A user grasps the mouse 12 and moves the mouse in a planar workspace on the surface 22 as indicated by arrows 24, as is well known in the art. Mouse 12 also preferably includes a sensor system for sensing motion of the mouse in its planar degrees of freedom, e.g. along the X and Y axes. The sensing system can include a standard mouse ball, an optical sensor, or other sensors as is well known in the art. Mouse 12 can be a "relative" device, which, as referenced herein, is a device that reports a change in position of the device to the host computer rather than an absolute position in a fixed reference frame; or the mouse can be an absolute device if preferred.

Mouse 12 is coupled to the computer 14 by a bus 20, which communicates signals between mouse 12 and computer 14 and may also, in some preferred embodiments, provide power to the mouse 12. Components such as the actuator assembly (described below) require power that can be supplied from an interface such as a USB or Firewire (IEEE 1394) bus. In other embodiments, signals can be sent between mouse 12 and computer 14 by wireless transmission/reception. In some embodiments, the power for the actuator can be supplemented or solely supplied by a power storage device provided on the mouse, such as a capacitor or one or more batteries.

Host computer 14 is a computing device that can take a wide variety of forms. For example, computer 14 can be a personal computer or workstation, such as a PC compatible computer or Macintosh personal computer, or a Sun or Silicon Graphics workstation. Such a computer 14 can operate under the Windows™, MacOS™, Unix, MS-DOS, or other operating system. Alternatively, host computer system 14 can be one of a variety of home video game console systems commonly connected to a television set or other display, such as systems available from Nintendo, Sega, Sony, or Microsoft. In other embodiments, host computer system 14 can be a "set top box", a "network-" or "internet-computer", a portable computer or game device, PDA, arcade machine, etc. Host computer preferably includes a host microprocessor, random access memory (RAM), read only memory (ROM), input/output (I/O) circuitry, disk drives, and other components of computers well-known to those skilled in the art.

Host computer 14 preferably implements a host application program with which a user is interacting via mouse 12 and other peripherals, if appropriate, and which may include haptic feedback functionality. For example, the host application program can be a drawing/CAD program, video game, word processor or spreadsheet, Web page or browser that implements HTML or VRML instructions, scientific analysis program, virtual reality training program or application, or other application program that utilizes input of mouse 12 and outputs force feedback commands to the mouse 12. Herein, for simplicity, operating systems such as Windows™, MS-DOS, MacOS, Linux, Be, etc. are also referred to as "application programs." In one preferred embodiment, an application program utilizes a graphical user interface (GUI) to present options to a user and receive input from the user. Herein, computer 14 may be referred as providing a "graphical environment,", which can be a graphical user interface, game, simulation, or other visual environment. The computer displays "graphical objects" or "computer objects," which are not physical objects, but are logical software unit collections of data and/or procedures that may be displayed as images by computer 14 on display screen 26, as is well known to those skilled in the art. The host application program checks for input signals derived from the electronics and sensors of mouse 12, and outputs force values and/or commands to be converted into forces output for mouse 12. Suitable software drivers which interface software with haptic feedback devices are available from Immersion Corporation of San Jose, Calif.

Display device 26 can be included in host computer system 14 and can be a standard display screen (LCD, CRT, flat panel, etc.), 3-D goggles, or any other visual output device. Typically, the host application provides images to be displayed on display device 26 and/or other feedback, such as auditory signals.

The haptic feedback system 10 can include a wide variety of architectures. For example, in some embodiments, the host computer 14 controls the output of actuators on the mouse 12 directly by streaming force values to the mouse 12. In other embodiments, a local microprocessor on the mouse 12 can receive high level commands from the host 14 and provide the force values to the actuator based on the host commands and local force processes. These implementations, and variations thereof, are described in U.S. Pat. No. 6,211,861, incorporated herein by reference in its entirety.

In other embodiments, many other types of interface or control devices may be used with the present inventions described herein. For example, a force feedback trackball, a joystick handle, steering wheel, knob, or other device can benefit from inertial force sensations. In addition, handheld devices are quite suitable for use with the presently-described inventions, such as handheld remote control device, gamepad controller for video games or computer games, or handheld electronic device or computer can be used with the haptic feedback components described herein. Handheld devices are not constrained to a planar workspace like a mouse but can still benefit from the sensations described herein which, for example, can be output perpendicularly from a device's surface or which can be output on a joystick handle, trackball, stylus, grip, wheel, or other manipulatable object on the device, or in a desired direction.

FIG. 1b is a perspective view of another embodiment of an interface device which can be used with the present invention, a gamepad system 10'. System 10' includes a gamepad interface device 12' and a host computer 14. Gamepad device 12' is in the form of a handheld controller, e.g. of similar shape and size to many gamepads currently available for video game console systems. A housing 15 of the interface device 10 is shaped to easily accommodate two hands gripping the device at the gripping projections 27a and 27b. In the described embodiment, the user accesses the various controls on the device 12' with his or her fingers.

A direction pad 30 can be included on device 12' to allow the user to provide directional input to the host computer 14.

One or more finger joysticks 32 can be included that project out of a surface of the housing 15 to be manipulated by the user in one or more degrees of freedom. In some embodiments, additional linear or spin degrees of freedom can be provided for the joystick, and/or a sphere can be provided instead of or in addition to the joystick 32 to provide directional input. Buttons 33 allow additional input. Other controls may also be placed within easy reach of the hands grasping the housing 15. For example, one or more trigger buttons can be positioned on the underside of the housing and can be pressed by the fingers of the user. Other controls can also be provided on various locations of the device 12, such as a dial or slider for throttle control in a game, a four- or eight-way hat switch, knobs, trackballs, a roller or sphere, etc. Inertial haptic sensations provided on the housing are described in greater detail below.

Interface device 12' can coupled to host computer 14 by a bus 34, which can be similar to the connection bus described above for FIG. 1a. Host computer 14 is preferably a video game console, personal computer, workstation, or other computing or electronic device as described above. Display device 26 can be included in host computer 14 and can be a standard display screen (LCD, CRT, flat panel, etc.), 3-D goggles, projection display device (e.g., projector or heads-up display in a vehicle), or any other visual output device, as described above.

Figure 2:
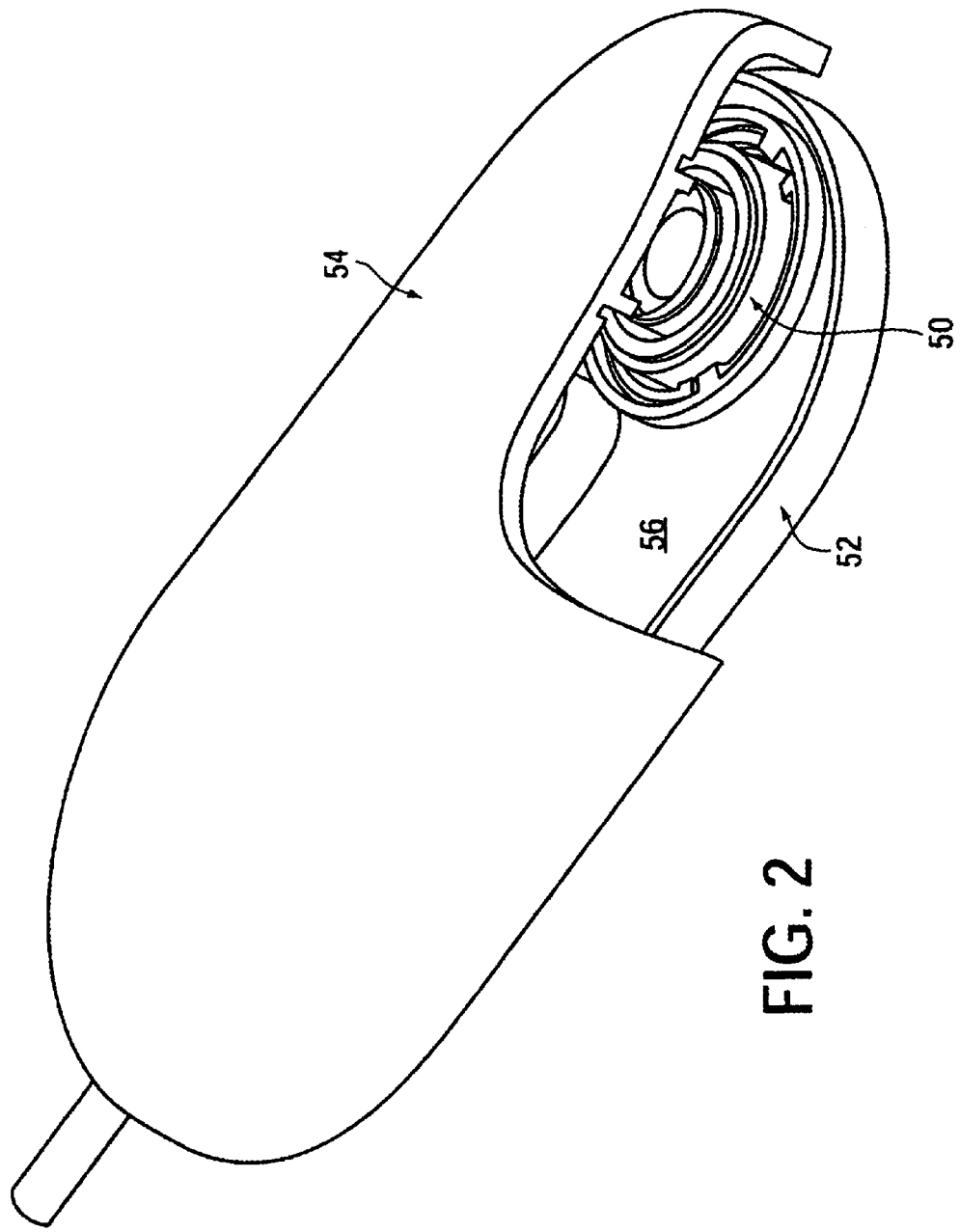
FIG. 2 is a perspective view of one embodiment of the mouse device of FIG. 1a for providing tactile inertial sensations to a user according to the present invention.
Figure 3:
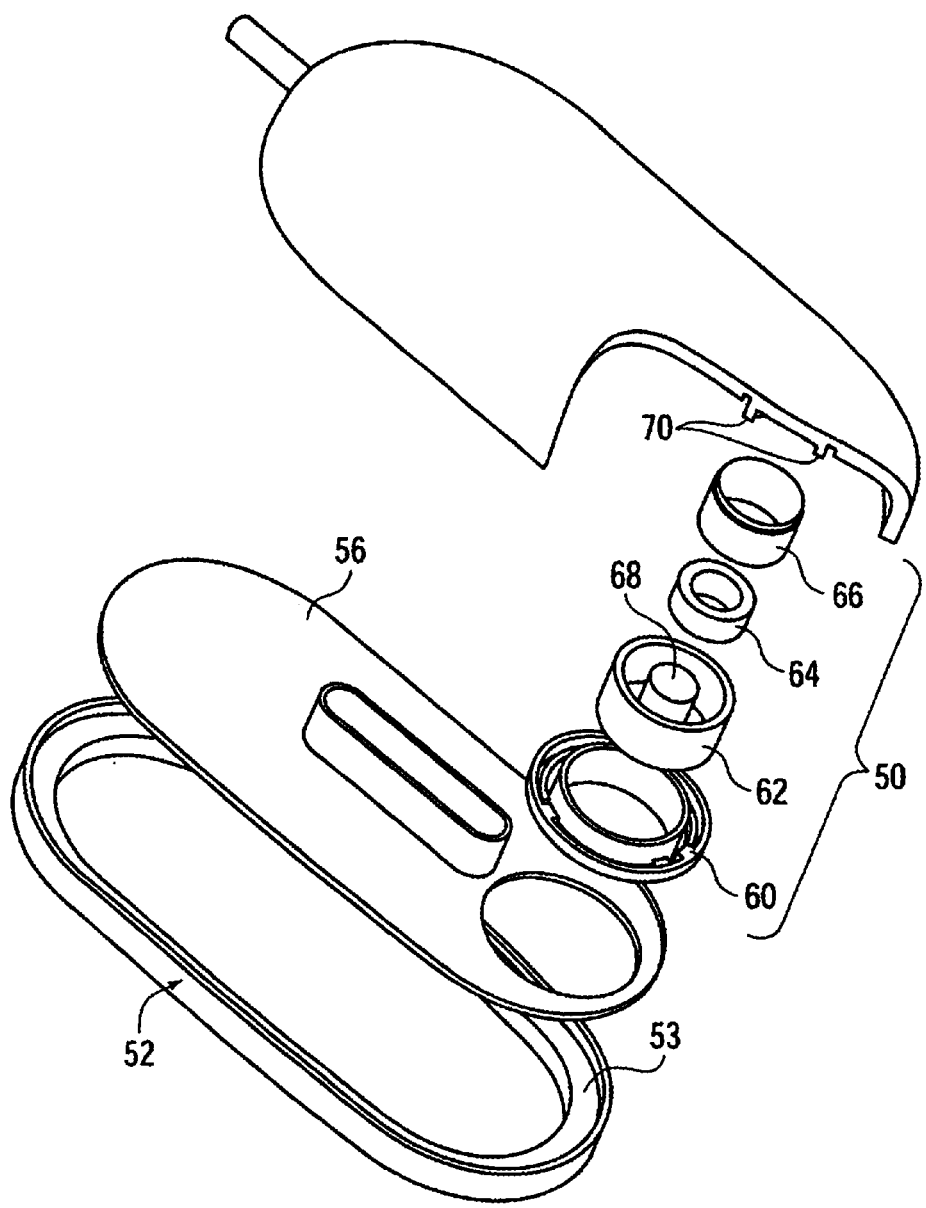
FIG. 3 is an exploded perspective view of the mouse device of FIG. 2.

FIG. 2 is a perspective view of one embodiment of mouse device 12 for providing tactile inertial sensations to a user of a mouse or other interface device contacted by the user according to the present invention. FIG. 3 is an exploded perspective view of mouse device 12 of FIG. 2.

Mouse device 12 includes a housing 40 that includes a base portion 52 and a top portion 54. A harmonic actuator assembly 50 is coupled to the base portion to provide inertial haptic sensations to a user contacting the housing of the mouse device. Harmonic actuator assembly 50 can alternatively be positioned in a housing of other types of devices, such as gamepads, trackballs, joysticks, steering wheels, remote controls, portable electronic devices, etc.

Base portion 52 is the bottom portion of the mouse housing and is a substantially flat member. The base 52 can include a raised inner rim 53 on which a printed circuit board (PCB) 56 is positioned. The rim 53 allows the PCB 56 to be supported a small distance above the bottom surface of the base portion 52.

An actuator assembly 50 is coupled to the PCB 56 and outputs inertial forces which are transmitted through the PCB 56 to the base 52 and from there to the housing of the device. In the embodiment shown, actuator assembly 50 is positioned at the back end of the mouse device 12, where the user's palm is typically positioned when operating the device. The assembly 50 can be positioned in other areas of the mouse housing in other embodiments.

In the described embodiment, harmonic actuator assembly 50 includes a molded flexure suspension 60, a pole piece 62, a ring magnet 64, and a coil 66. Flexure suspension 60 is coupled to the PCB 56, and the pole piece 62 is coupled to the interior wall of the flexure suspension 60 so that the suspension 60 surrounds the pole piece. The ring magnet 64 is coupled to the pole piece 62, where the pole piece surrounds the magnet 64 and a central projecting member 68 of the pole piece extends through the center of the magnet 64. The pole piece can be made of a material such as magnetic iron or steel. The pole piece 62 and ring magnet 64 together form an inertial mass that is moved by the present invention to provide inertial sensations to the user of the mouse device.

A top portion 54 is the upper portion of the device housing on which the user's hand rests. In one embodiment, the entire top piece 54 can tilt to engage contacts and provide a button signal to the host computer; in other embodiments, separate buttons can be placed on or coupled to the top portion 54. The coil 66 is coupled to the underside of the top portion 54 at ridges 70 and is therefore grounded with respect to the other components of the actuator assembly 50. The coil 66 is positioned surrounding the ring magnet and is surrounded by the walls of the pole piece 62.

An inertial mass of the actuator assembly 50 is oscillated in a degree of freedom to provide inertial forces that are experienced as tactile feedback by the user. In a mouse embodiment, as shown, inertial forces are preferably directed along a z-axis that is approximately perpendicular to the planar degrees of freedom of mouse movement and the support surface on which the mouse rests. Tactile sensations can be applied at a perceptually strong level for the user along the z-axis without impairing the ability to accurately position a user controlled graphical object in the X and Y axes. Furthermore, since the tactile sensations are directed in a third degree of freedom relative to the two-dimensional mouse planar workspace and display screen, jolts or pulses output along the Z-axis feel much more like three-dimensional bumps or divots to the user, increasing the realism of the tactile sensations and creating a more compelling interaction. For example, an upwardly-directed pulse that is output when the cursor is moved over a window border creates the illusion that the mouse is moving "over" a bump at the window border.

The actuator assembly is operative to oscillate the inertial mass quickly along the axis Z. Thus, inertial forces produced by the moving mass are transmitted to the housing through the grounded portion of the actuator assembly and felt by the user. These forces are substantially directed along the Z axis. Preferably, the mass has an origin position that is positioned between the extremes of the range of motion of the mass. Other embodiments, such as floating handheld devices or moveable objects such as joystick handles or trackball spheres, may include an inertial mass that is moved in other directions than the z-axis. In addition, some embodiments can provide simultaneously-operating multiple actuator assemblies 50 to allow enhanced tactile feedback. A variety of tactile sensations can be output to the user, many of which are described in U.S. Pat. No. 6,211,861. That patent also describes several advantages to the z-axis direction of inertial forces in a mouse embodiment.

In addition, it is preferred that the mouse rest on a flexible or semi-flexible surface, such as a standard mouse pad. This type of flexible surface increases the transmissibility of the inertial forces from the actuator to the housing and allows the inertial sensations to be amplified, rather than countered by normal forces applied by a hard surface such as a table surface. The flexible surface can alternatively be provided as a compliant layer (e.g., made of rubber or foam) provided between the actuator-coupled portion of the mouse housing and a rigid support surface on which the mouse rests. For example, the compliant layer can be provided on the bottom of the mouse housing and coated with a smooth material or surface to allow the mouse to slide on a support surface such as a table or desk; or a compliant layer can be provided between a base portion of the mouse housing and a top portion of the housing contacted by the user.

Figure 4:
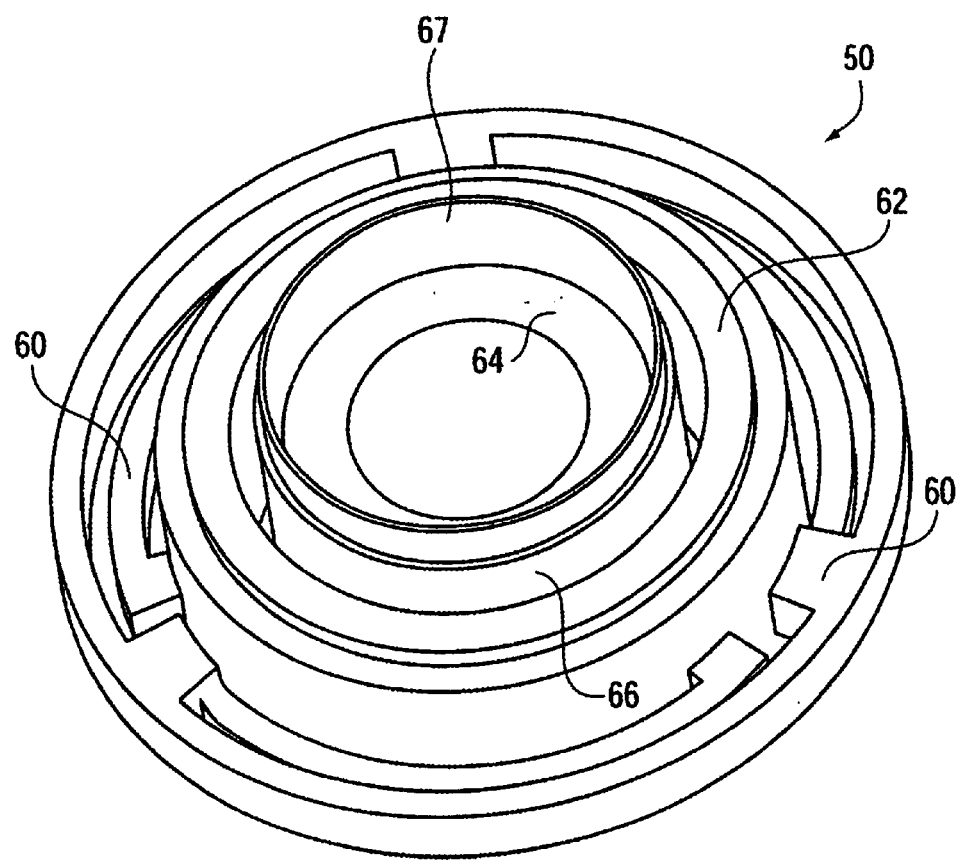
FIG. 4 is a perspective view of an actuator assembly of the mouse device of FIG. 3.
Figure 5:
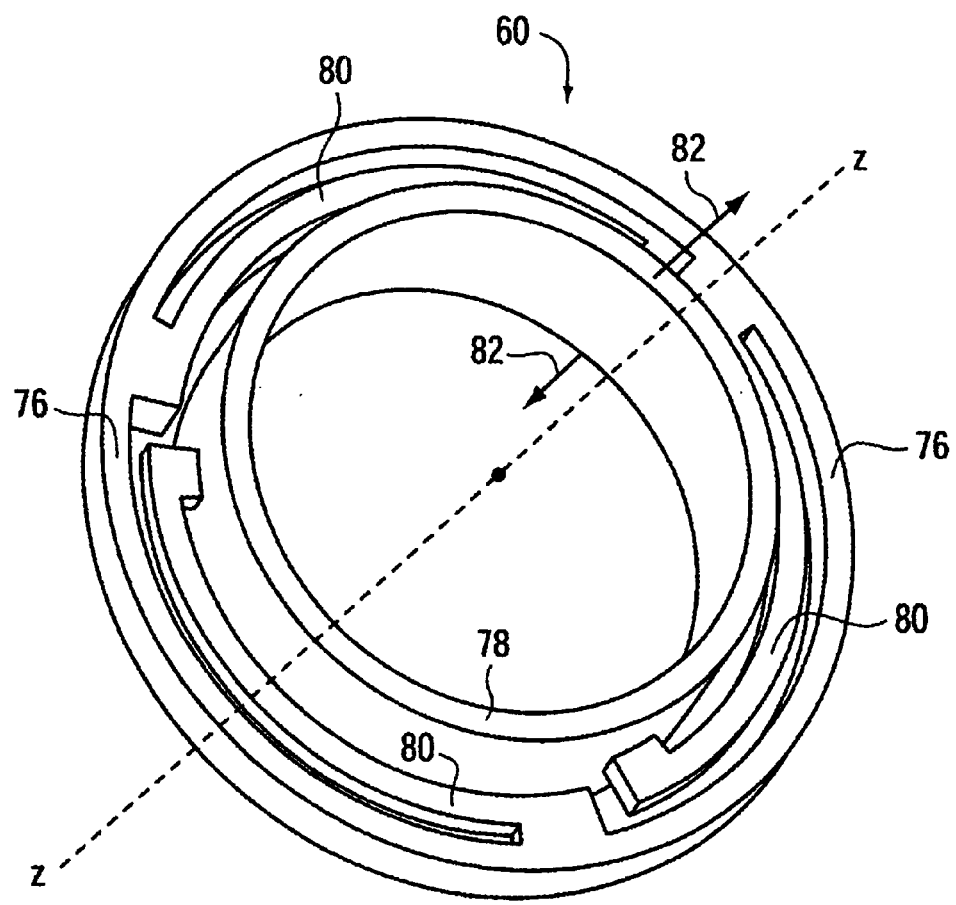
FIG. 5 is a perspective view of a flexure suspension of the actuator assembly of FIG. 4.

FIG. 4 is a perspective view of the actuator assembly 50 of the mouse device 12. As shown, the coil 66 is positioned around the magnet 64 that is positioned at the center. A bobbin 67 is coupled to and provides a backing for the coil 66 to protect and maintain the integrity of the coil. The pole piece 62 is positioned surrounding the coil 66. FIG. 5 is a perspective view of the flexure suspension 60. Suspension 60 includes an outer ring 76, an inner ring 78, and a number of connecting flexing members 80 that join the inner ring to the outer ring. Three flexing members 80 are shown in the described embodiment, spaced evenly around the flexure; a different number of flexing members can be used in other embodiments. The outer ring 76 is coupled to the PCB (or to some other support or to the housing of the mouse) and is therefore grounded, while the pole piece 62 is coupled to the inner ring 78. The flexing members 80 are compliant to allow the inner ring 78 to move along the axis Z extending perpendicularly to the plane in which the flexure approximately lies, thus allowing the pole piece 62 and the magnet 64 to move with the inner ring 78. The flexure suspension 50 is a single, unitary piece that can be manufactured as such, thereby greatly reducing manufacturing costs. Since the suspension is a single piece, the inner ring 78 and outer ring 76 are made of the same material as the flexing members 80. However, since the inner and outer rings preferably do not flex, they are made thicker in the flexing direction (along the Z axis) than the flexing members 80.

Figure 6:
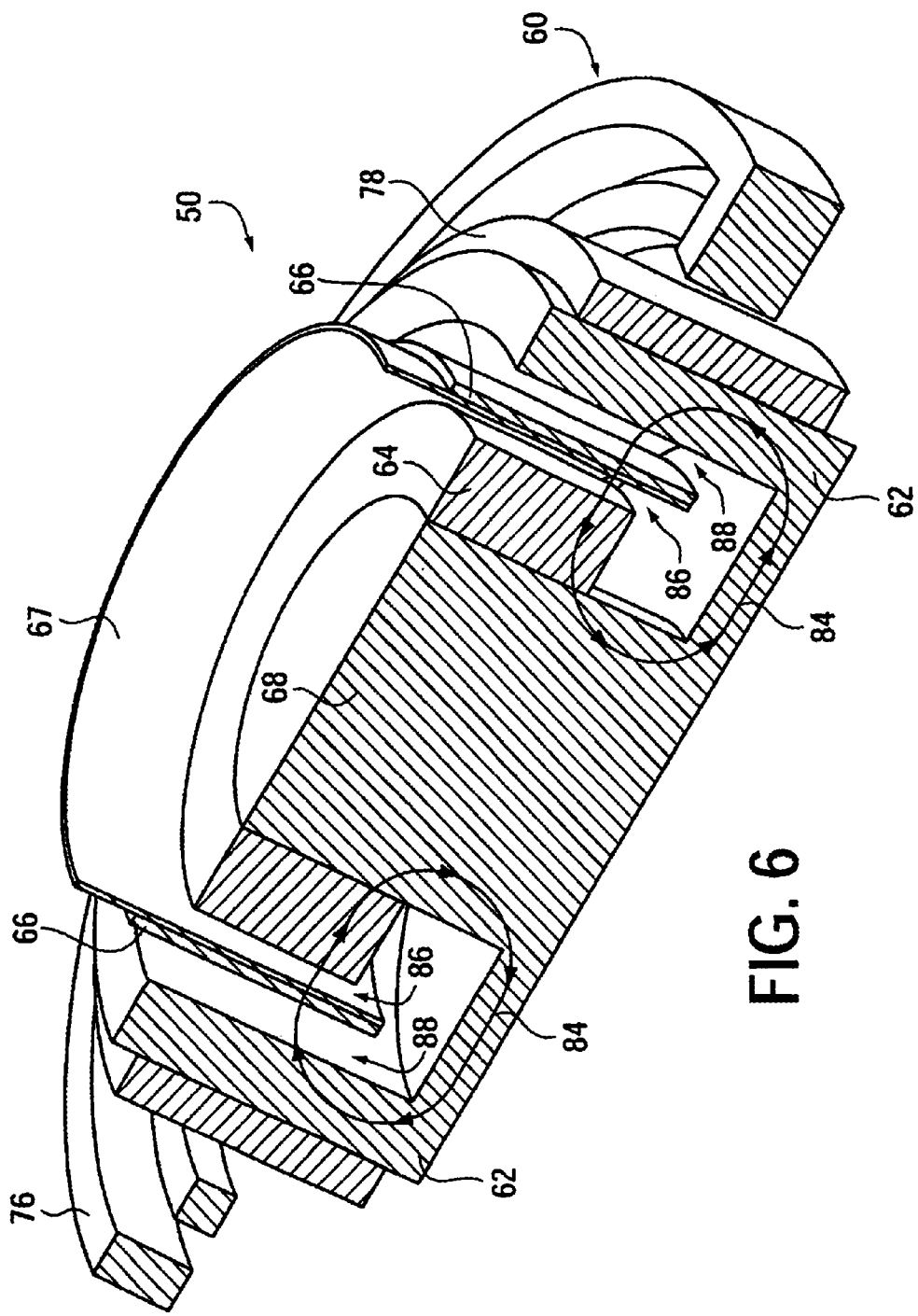
FIG. 6 is a perspective cross-sectional view of the actuator assembly of FIG. 4.

In one embodiment, the flexing suspension 60 can provide about 1 millimeter of movement of the inner ring with respect to the outer ring in each direction from the center (origin) position shown in FIG. 6, as indicated by arrows 82. Other embodiments can included different amounts of flex displacement. The inner ring 78, pole piece 62, and magnet 64 are oscillated within the desired range of motion (e.g. 2 mm) to provide tactile sensations on the housing of the mouse and to the user contacting the housing. The flexing members 80 also each include an inherent mechanical centering spring, so that the inner ring is biased to move back to the origin position when it is moved in either direction. This allows the inner ring, pole piece, and magnet to be oscillated more efficiently, with the centering spring providing much of the force to return the inertial mass back from either extreme position in the range of movement of the mass. In any of the actuator assembly embodiments described herein, the assembly can also include a damper to provide damping in addition to the centering spring force. Damper elements could include members or layers such as foam, or materials such as oil, to dampen the highest magnitude forces.

In other embodiments, other types or forms of flexure suspensions can be used in the present invention to cause or allow the pole piece and mass to move in a z-direction. One example of an alternate flexure is described below with reference to FIGS. 7a and 7b. In other embodiments, for example, a speaker suspension can be used. Most audio speakers include a flexible circular accordion-type suspension that allows the speaker diaphragm to move and produce sound, and such a suspension can be used in the present invention to allow the inertial mass to move along the Z-axis.

FIG. 6 is a perspective cross-sectional view of the actuator assembly 50 of FIG. 4. Flux lines 84 indicate a path of magnetic flux caused when current is flowed in the coil 66 (the lines may go in either direction, depending on the direction of the current). A small gap 86 is provided between the magnet 64 and the coil 66, preferably about 0.25 to 0.5 mm. Another gap is also provided between then coil 66 and the pole piece 62, preferably larger than the gap 86 so that if any of the moving parts touch, the bobbin 67 will be impacted instead of the coil 66.

This view also shows that the ring magnet 64 preferably extends flush with the top of the pole piece 62 down to a middle portion of the projecting member 68 of the pole piece and not the entire length of the projecting member 68. This allows the flux 84 to have a narrower path through the coil, increasing the force derived from the magnetic properties of the magnet and coil. Alternatively, the magnet 64 can cover some other portion of the projecting member 68 to narrow the flux path.

Figure 7A:
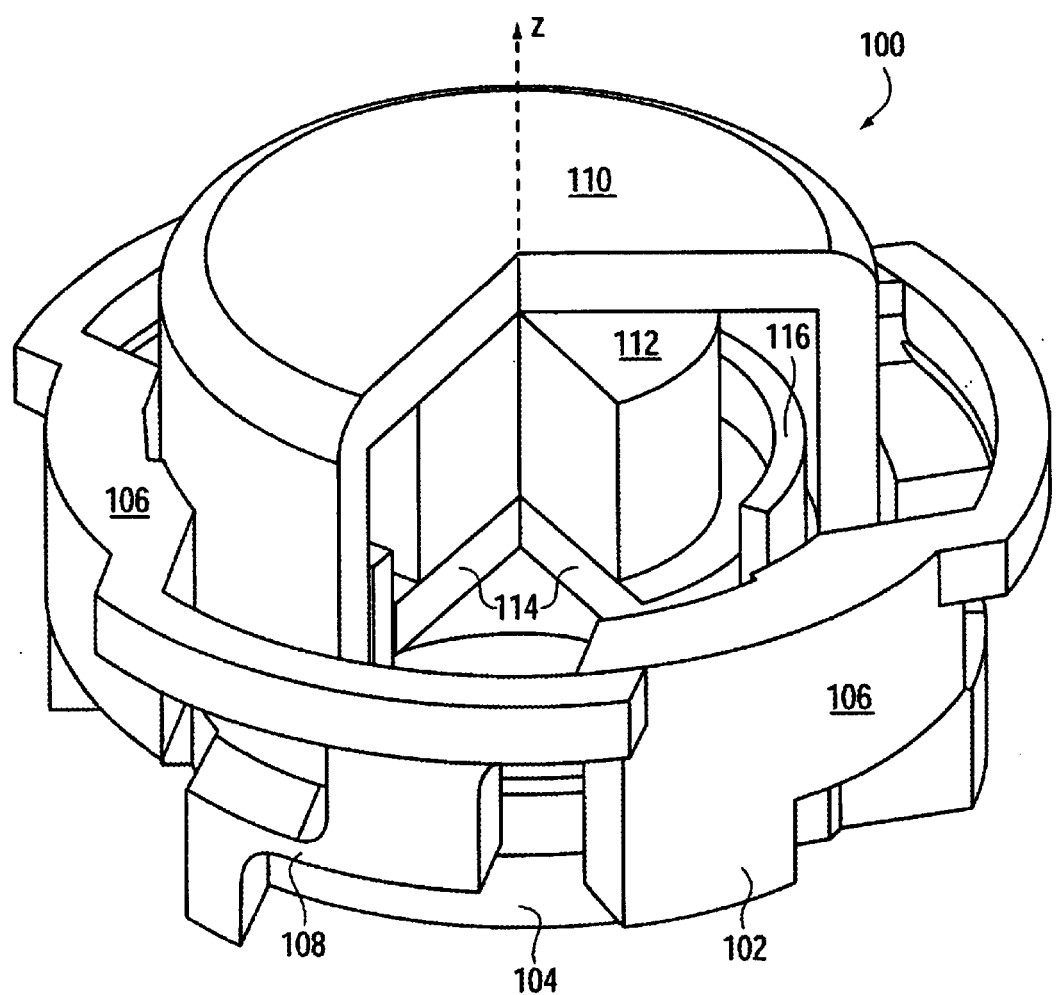
FIGS. 7a and 7b are perspective views of an alternate embodiment of the actuator assembly of the present invention for producing tactile sensations to a user.
Figure 7B:
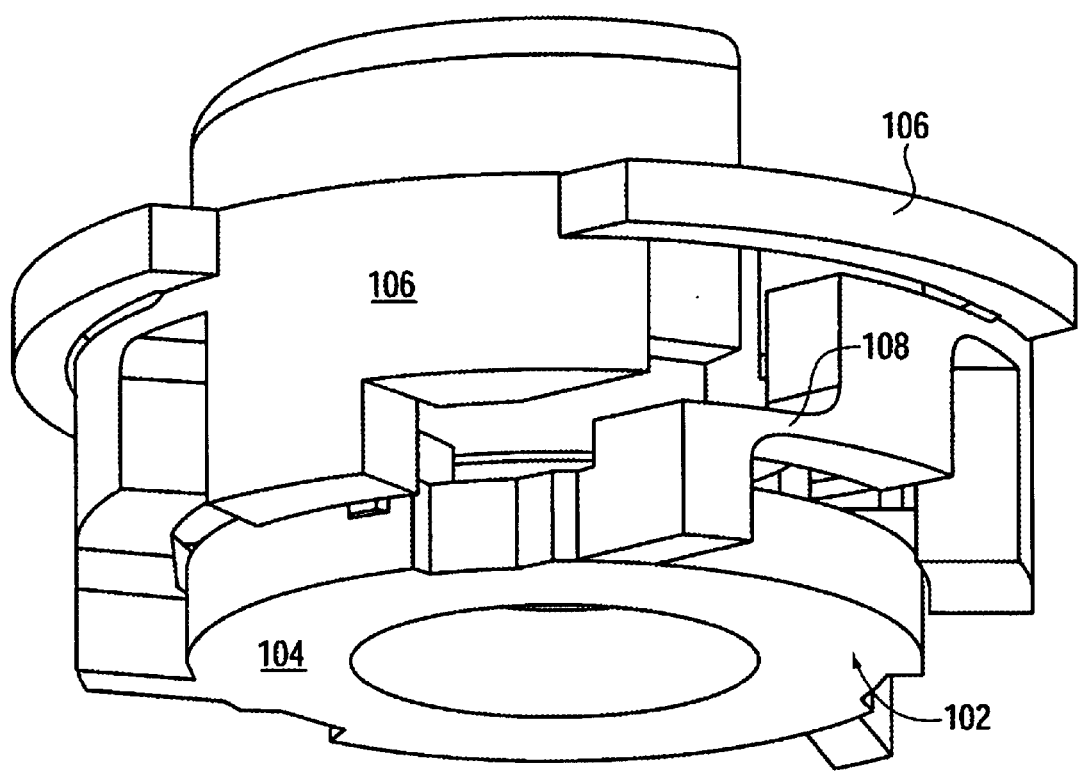

FIGS. 7a and 7b are perspective views of an alternate embodiment 100 of the actuator assembly of the present invention for producing tactile sensations to a user. FIG. 7c is an exploded perspective view of the major components of the assembly. Assembly 100 is similar to assembly 58 in that a magnet and pole piece are moved linearly with respect to a grounded coil using a flexure suspension.

Flexure suspension 102 is grounded to PCB 56 or other grounded portion of the device 12 such as the housing. A flexing portion 104 of the suspension 102 is coupled to the grounded portion 106 of the suspension 102 by flex joints 108, where multiple flex joints are spaced about the circumference of the suspension 102. The flexing portion 104 is coupled to a return path piece 110 which is shown as a cylindrical, hollow shell and provides a return path for the magnetic flux. A cylindrical magnet 112 is coupled to the return path piece 110 at the top of the magnet 112 and is a smaller diameter than the return path piece so that a gap is provided between the magnet and return path piece on all sides of the magnet. A pole piece 114 is also coupled at the end of the magnet 112 opposite its coupling to the return path piece 110 to provide a complete flux return path and channeling of magnetic flux, as explained with reference to FIG. 8.

Coil 116 is positioned between the magnet 112 and the return path piece 110. Coil 116 is coupled directly to the grounded portion 106 of the suspension 102 and thus is grounded with respect to the pole piece and magnet.

As described with reference to FIG. 2, the return path piece 110, magnet 112, and moving portion 104 are used as an inertial mass that is oscillated or pulsed along the z-axis to provide tactile feedback to the user of the device. A range of motion of about 1–3 mm can be used in the present embodiment. The flex joints 108 preferably include an inherent mechanical spring return force that causes the inertial mass to move back to its origin position without the need for outputting a magnetic force.

Figure 8:
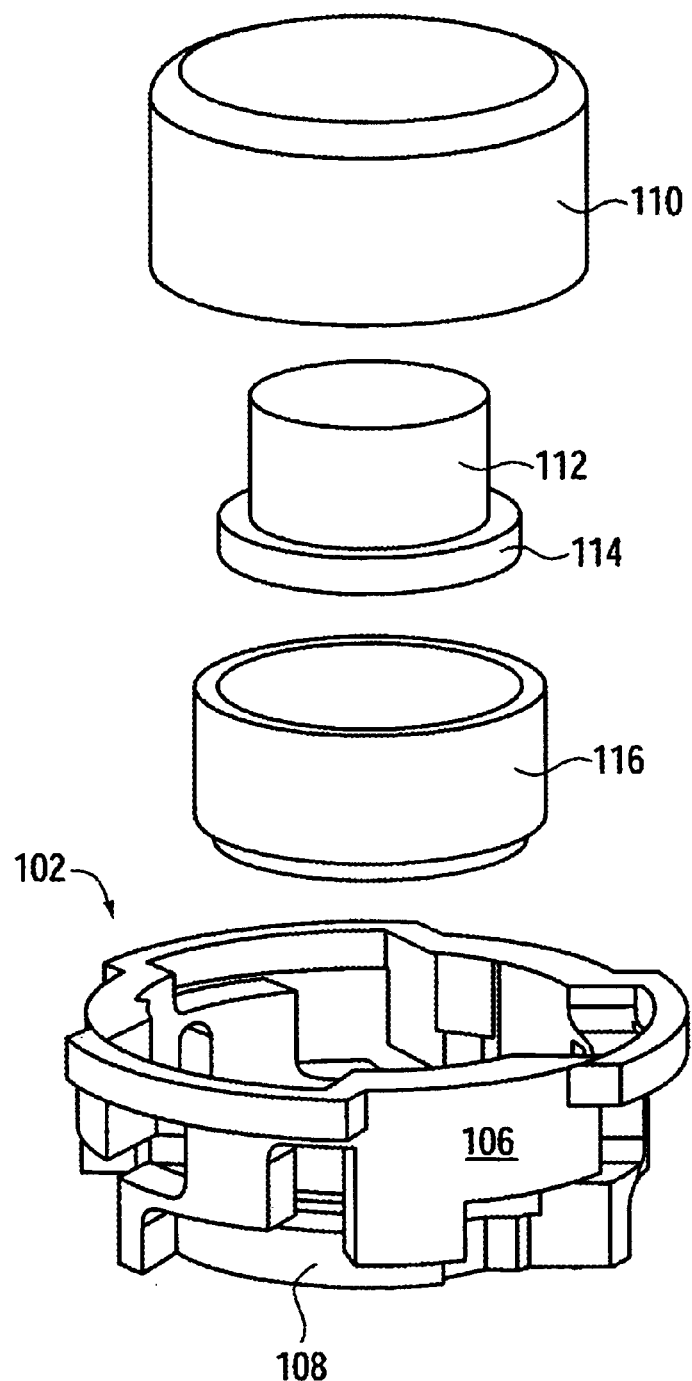
FIG. 8 is a side elevational view of the actuator assembly of FIGS. 7a and 7b.

FIG. 8 is a side elevational view of the actuator assembly 100. The return path piece 110 surrounds the cylindrical magnet 112 and the coil 116. The pole piece 114 is positioned on one side of the magnet 112. As shown by arrows 120, the magnetic flux preferably follows a path through the pole piece and pole piece 114. The pole piece is preferably made narrow to allow a greater channeling of flux and a greater force on the inertial mass.

Figure 9A:
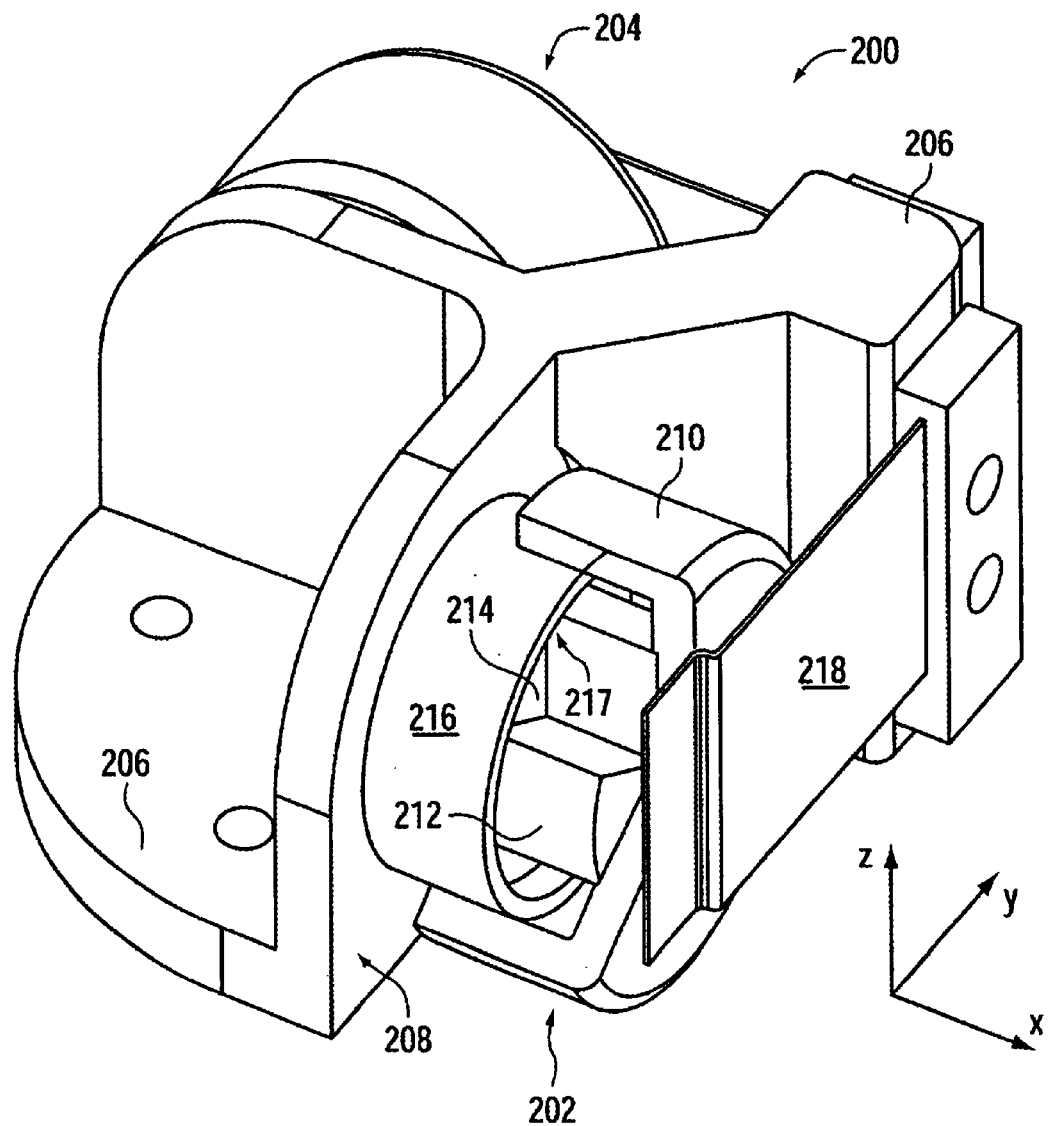
FIGS. 9a, 9b, and 9c are perspective and top plan views of an actuator system that can be used in an inertial tactile interface device to output directional inertial force sensations.
Figure 9B:
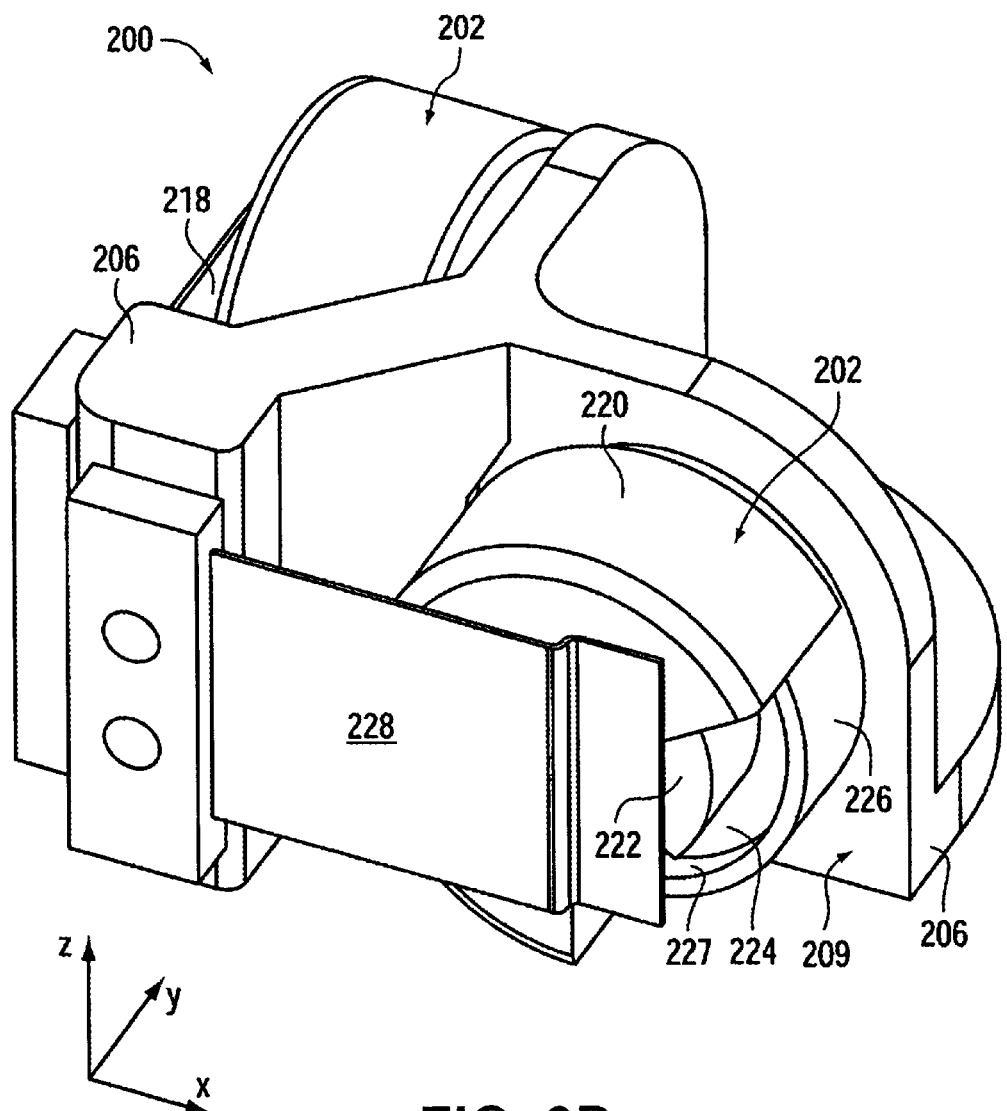
Figure 9C:
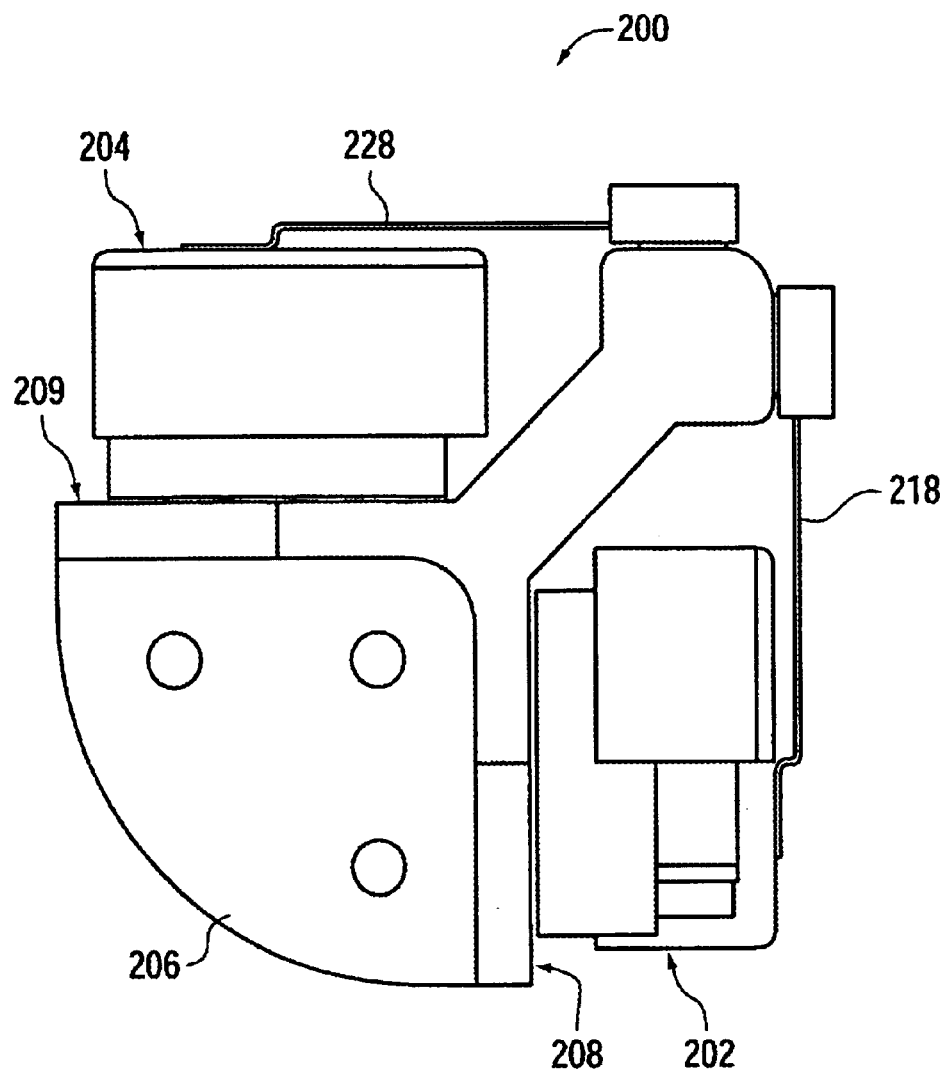

FIGS. 9a, 9b, and 9c are perspective and top plan views of an actuator system 200 that can be used in an inertial tactile interface device to output directional inertial force sensations. System 200 is suitable for use in many types of tactile devices, including mice, gamepads, handheld steering wheels, fishing-type controllers, joysticks, trackballs, grips, remote controls, handheld devices, flat screens, styluses, etc. Actuator system 200 preferably includes actuator assemblies 202 and 204, which can be similar to the linear actuator assemblies described above.

System 200 includes a grounded support 206 which is coupled to the housing of the interface device. Actuator assembly 202 is coupled to a surface 208 of the support 206 provided in the y-z plane. Actuator assembly 202 includes a return path piece 210 which can be a hollow, cylindrical shell. A cylindrical magnet 212 is coupled to the return path piece 210 at a flat end of the magnet and is a smaller diameter than the return path piece so that a gap is provided between magnet and return path piece. A pole piece 214 is coupled to the end of the magnet 212 opposite its coupling to the return path piece 210, as described above with reference to FIGS. 7a and 7b. A coil 216 is positioned between the magnet 212 and return path piece 210 and is coupled directly to the grounded support 206. The coil 216 can be positioned on a bobbin 217 that provides a backing to the inside of the coil.

The return path piece 210 is also coupled to a spring member 218, and the spring member is compliantly coupled to the support 206. The spring member 218 is operative to flex in the direction perpendicular to the surface 208 of the support 206. This is the direction of movement of the pole piece 210 and magnet 212 when a current is flowed through the coil 216. Thus, when the actuator assembly 202 is energized, the return path piece 210 and magnet 212 move along the x-axis with respect to the grounded coil 206. By providing an oscillating current (such as a sine or other periodic waveform), the return path piece 210 and magnet 212 can be made to oscillate along the x-axis to provide inertial forces on the housing of the interface device.

Actuator assembly 204 is preferably made similar to actuator assembly 202. As shown in FIG. 9b, actuator assembly 204 can include a return path piece 220, magnet 222, pole piece 224, coil 226, bobbin 227, and spring member 228 which operate similarly to these components of actuator 202. Coil 226 of actuator assembly 204 is grounded to a surface 209 of support 206, where surface 209 is oriented in the x-z plane. Thus, the spring member 228 flexes along the y-axis and allows the return path piece 220 and magnet 222 to oscillate along the y-axis to provide inertial forces along that axis.

Since the actuator assemblies 202 and 204 are oriented in orthogonal directions, the inertial forces that each actuator assembly outputs is distinct from the inertial forces output by the other actuator assembly. If inertial forces are desired along the x-axis, then actuator assembly 202 is oscillated, and if inertial forces are desired along the y-axis, then actuator assembly 204 is oscillated. If inertial forces are desired in an intermediate direction, then both the actuator assemblies 202 and 204 can be energized simultaneously. The resultant force will have a direction and a magnitude dependent on the magnitude of each of the forces output by the actuator assemblies 202 and 204. The force output by the actuator assemblies 202 and 204 is in turn dependent on the control current signals input to those actuator assemblies. Various directional force outputs and control signals are described in greater detail below with respect to FIGS. 10a–10d and 11.

The x-axis and y-axis shown in FIGS. 9a–9c can be oriented in any desired plane of the interface device. For example, the system 200 can be positioned on the interior bottom, top, or side surface of the device housing. In many handheld embodiments, the system 200 can be positioned so that the x- and y-axes are oriented in the horizontal plane of the device when it is held normally by the user.

In alternate embodiments, different components can be used. For example, the spring member 228 is shown as a leaf spring, but can be implemented with other compliant structures. One embodiment can use a flexure similar to flexure 102 of FIG. 7a or flexure 60 of FIG. 4 in place of the spring member 228 to provide the compliance and spring return force. It should also be noted that other types of flexures, actuators, and devices that produce a linear, oscillatory motion of a mass can be used to produce the inertial forces along the x-axis and along the y-axis. For example, actuator assemblies that can be used in place of actuator 202 or 204 are described in copending patent applications Ser. No. 09/585,741, filed Jun. 2, 2000, and Ser. No. 60/236,558, filed Sep. 28, 2000, and entitled, "Device and Assembly for Providing Linear Inertial Tactile Sensations" both incorporated herein by reference in their entireties, which describes motors and flexures that causes inertial forces via linear oscillatory motion of a mass (or motion of the motor itself as the mass).

FIGS. 10a–10d are graphs illustrating harmonic control signals for the actuator assemblies 202 and 204 of the actuator system 200 described above, and resultant forces output by the device. Other types of actuators or actuator assemblies outputting a linear oscillating inertial force can also be used in this aspect of the invention. To achieve a force purely along the x-axis or the y-axis, the appropriate actuator assembly 202 or 204 is energized while the other actuator is turned off. To output forces along other axes and in other directions between these x- and y-directions, both actuator assemblies are operated simultaneously, as described below.

Figure 10A:
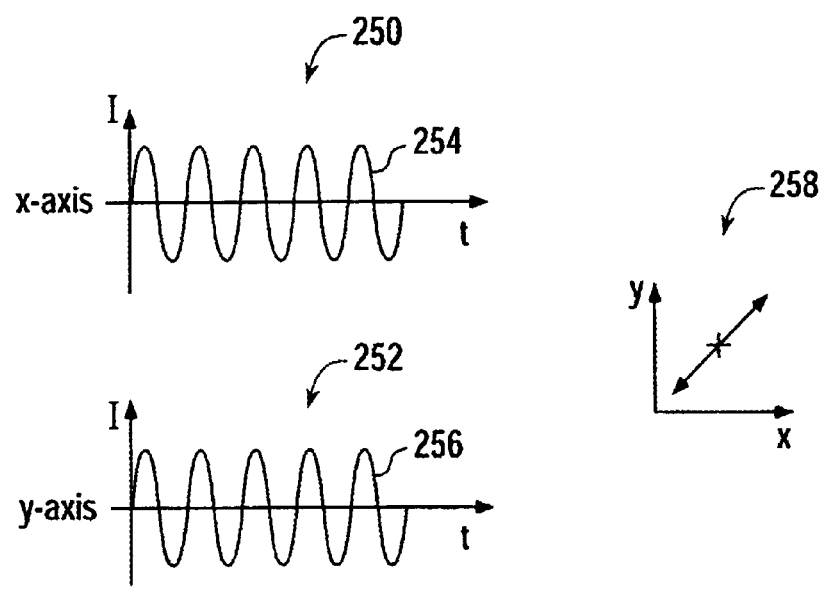
FIGS. 10a–10d are graphs illustrating harmonic control signals for the actuator assemblies of FIGS. 9a–9c and resultant forces output by the device.

FIG. 10a illustrates graphs 250 and 252 showing the control signal waveform 254 for actuator assembly 202 and the control signal waveform 256 for actuator assembly 204 (commanded current vs. time graphs). Graph 250 shows the control signal for the x-axis (actuator assembly 202) and graph 252 shows the control signal for the y-axis (actuator assembly 204). The waveforms 254 and 256 are sine waves that oscillate about zero to drive the mass of the actuator assemblies in both directions. In FIG. 10a, waveforms 254 and 256 are in phase and have the same magnitude. Thus, the force magnitude output by each actuator assembly is equal at each point in time, leading to the resultant force shown in diagram 258. The resultant force is an oscillatory force having a maximum magnitude of about 1.4 times the maximum magnitude of each waveform 254 and 256, and is directed along an axis oriented at about 45 degrees from a purely x-axis or purely y-axis force.

Figure 10B:
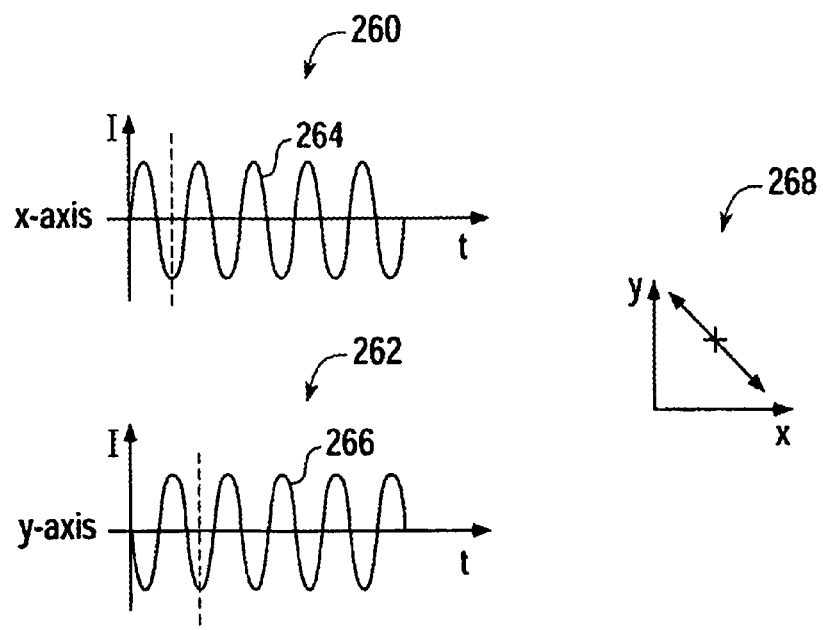

In FIG. 10b, graph 260 shows a waveform 264 controlling the actuator assembly 202 for the x-axis, and graph 262 shows a waveform 266 controlling the actuator assembly 204 for the y-axis. Here, the control waveforms have the same magnitude but are 180 degrees out of phase. This causes a oscillatory resultant force as shown in diagram 268, where the resultant force has a maximum magnitude of about 1.4 times the waveform magnitudes, and is oriented along an axis that is spaced 90 degrees from the resultant force shown in diagram 258, i.e. at −45 degrees.

Figure 10C:
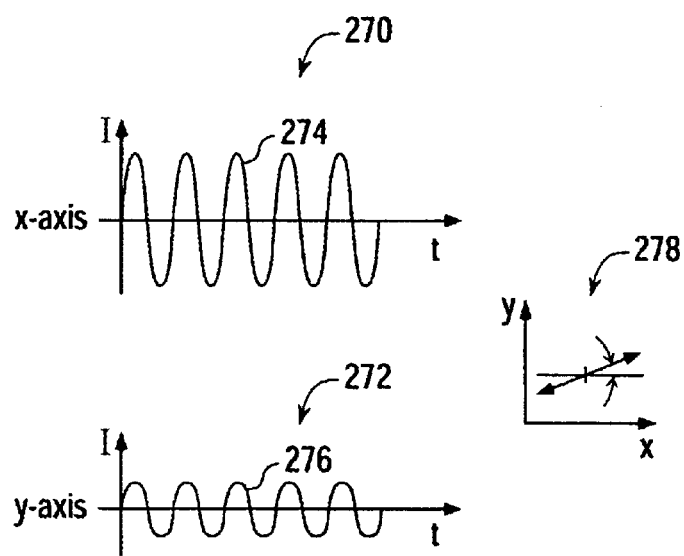

In FIG. 10c, graph 270 shows a waveform 274 controlling the actuator assembly 202 for the x-axis, and graph 272 shows a waveform 276 controlling the actuator assembly 204 for the y-axis. Here, waveform 274 has a greater magnitude than the waveform 276, but the waveforms are in phase. This causes a resultant vibration force as shown in diagram 278, where the axis is oriented closer to the x-axis due to the waveform 274 having a greater magnitude. Other directions positioned between the x- and y-axes can be similarly achieved by altering the magnitude of the waveform 274 or 276 appropriately. The relationship between the angle θ of the resultant vector and the magnitudes of the forces along the x- and y-axes is a simple tangent, $\tan \theta = y/x$.

Figure 10D:
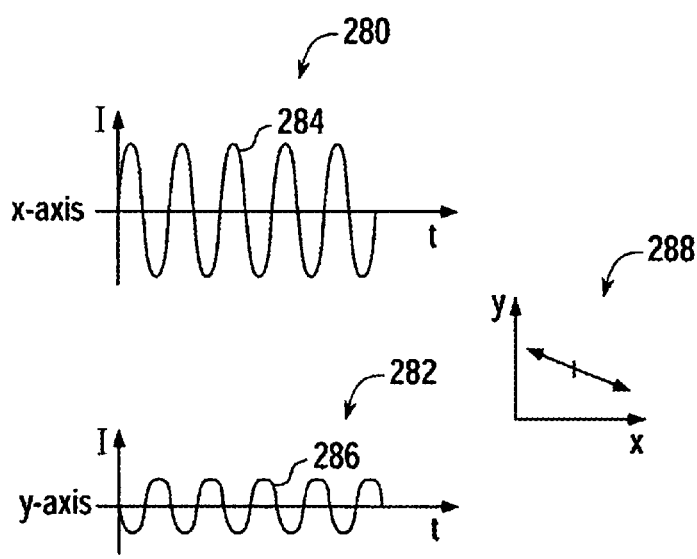

In FIG. 10d, graph 280 shows a waveform 284 controlling the actuator assembly 202 for the x-axis, and graph 282 shows a waveform 286 controlling the actuator assembly 204 for the y-axis. Here, waveform 284 has a greater magnitude than the waveform 276, and the waveforms are 180 degrees out of phase. This causes a resultant vibration force as shown in diagram 288, where the axis of vibration is located in the other two quadrants not covered by the vibration in diagram 278 and is oriented closer to the x-axis due to the waveform 284 having a greater magnitude. Other directions positioned between the x- and y-axes can be similarly achieved by altering the magnitude of the waveform 284 or 286 appropriately.

In other embodiments, a force not as directed along a single axis can be provided by providing a different phase difference between the x and y waveforms. For example, a 30 degree phase difference would cause a roughly "oval" force to be output, where the inertial force direction would not be changing along a single axis, but would shift in a wider pattern like an oval.

Figure 11:
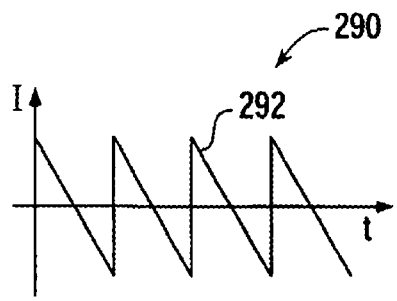
FIG. 11 is a graph illustrating a control signal waveform for driving inertial actuator assemblies to provide a force approximately in one direction.

FIG. 11 is a graph 290 illustrating a control signal waveform 292 for driving actuator assembly 202 and/or actuator assembly 204 (or any other harmonic actuator described or referenced herein) to provide a force approximately in one direction rather than an oscillatory force along an axis. The waveform 292 is shaped like a sawtooth, where the waveform increases in magnitude in one direction steeply, and after reaching the peak, is moved in the other direction gradually. Thus, waveform 292 increases positively at a steep rate, then more gradually falls back toward zero and into the negative portion of the graph. The waveform can be again increased steeply in the positive direction if multiple forces in the positive direction are desired. This has the effect of driving the inertial mass (such as a pole piece and magnet or other mass) fast and quickly in the positive direction, and moving the inertial mass more slowly and gradually in the negative direction, so that the user will feel a greater acceleration and force in the positive direction and a much lower-magnitude force in the negative direction. To output a force in the negative direction and not the positive direction, the waveform can be reversed so that the curve increases gradually, then falls steeply.

Figure 12:
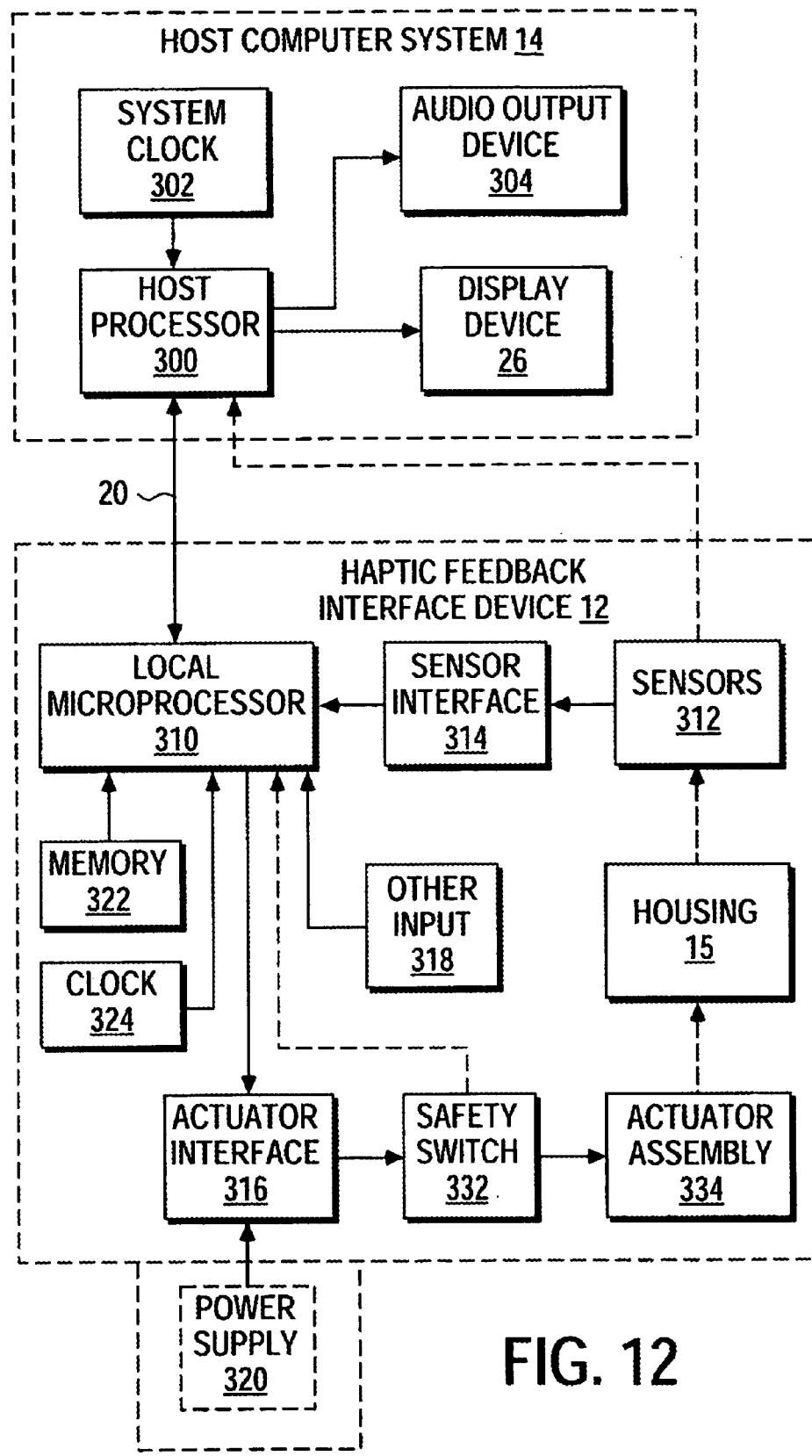
FIG. 12 is a block diagram illustrating one embodiment of a haptic feedback system suitable for use with the present invention.

FIG. 12 is a block diagram illustrating one embodiment of a haptic feedback system suitable for use with the present inventions.

Host computer system 14 preferably includes a host microprocessor 300, a clock 302, a display screen 26, and an audio output device 304. The host computer also includes other well known components, such as random access memory (RAM), read-only memory (ROM), and input/output (I/O) electronics (not shown). Display screen 26 displays images of a game environment, operating system application, simulation, etc. Audio output device 304, such as speakers, is preferably coupled to host microprocessor 300 via amplifiers, filters, and other circuitry well known to those skilled in the art and provides sound output to user when an "audio event" occurs during the implementation of the host application program. Other types of peripherals can also be coupled to host processor 300, such as storage devices (hard disk drive, CD ROM drive, floppy disk drive, etc.), printers, and other input and output devices.

The interface device 12, such as a mouse, gamepad, etc., is coupled to host computer system 14 by a bi-directional bus 20 The bi-directional bus sends signals in either direction between host computer system 14 and the interface device. Bus 20 can be a serial interface bus, such as an RS232 serial interface, RS-422, Universal Serial Bus (USB), MIDI, or other protocols well known to those skilled in the art; or a parallel bus or wireless link. For example, the USB standard provides a relatively high speed interface that can also provide power to the actuator of actuator assembly 54.

Device 12 can include a local microprocessor 310. Local microprocessor 310 can optionally be included within the housing of device 12 to allow efficient communication with other components of the mouse. Processor 310 is considered local to device 12, where "local" herein refers to processor 310 being a separate microprocessor from any processors in host computer system 14. "Local" also preferably refers to processor 310 being dedicated to haptic feedback and sensor I/O of device 12. Microprocessor 310 can be provided with software instructions to wait for commands or requests from computer host 14, decode the command or request, and handle/control input and output signals according to the command or request. In addition, processor 310 can operate independently of host computer 14 by reading sensor signals and calculating appropriate forces from those sensor signals, time signals, and stored or relayed instructions selected in accordance with a host command. Suitable microprocessors for use as local microprocessor 310 include the MC68HC711E9 by Motorola, the PIC16C74 by Microchip, and the 82930AX by Intel Corp., for example, as well as more sophisticated force feedback processors such as the Immersion Touchsense Processor. Microprocessor 310 can include one microprocessor chip, multiple processors and/or co-processor chips, and/or digital signal processor (DSP) capability.

Microprocessor 310 can receive signals from sensor(s) 312 and provide signals to actuator assembly 54 in accordance with instructions provided by host computer 14 over bus 20. For example, in a local control embodiment, host computer 14 provides high level supervisory commands to microprocessor 310 over bus 20, and microprocessor 310 decodes the commands and manages low level force control loops to sensors and the actuator in accordance with the high level commands and independently of the host computer 14. This operation is described in greater detail in U.S. Pat. Nos. 5,739,811 and 5,734,373, both incorporated by reference herein. Force commands are output from the host computer to microprocessor 310 and instruct the microprocessor to output a force or force sensation having specified characteristics. The local microprocessor 310 reports locative and button data to the host computer. Actuator signals are provided from the microprocessor 310 to actuator assembly 334 and sensor signals are provided from the sensor 312 and other input devices 318 to the microprocessor 310. Herein, the term "haptic sensation" or "tactile sensation" or "force sensation" refers to either a single force or a sequence of forces output by the actuator assembly 54 which provide a sensation to the user. The microprocessor 310 can process inputted sensor signals to determine appropriate output actuator signals by following stored instructions. The microprocessor may use sensor signals in the local determination of forces to be output on the user object, as well as reporting locative data derived from the sensor signals to the host computer.

In yet other embodiments, other simpler hardware can be provided locally to device 12 to provide functionality similar to microprocessor 310. For example, a hardware state machine incorporating fixed logic can be used to provide signals to the actuator assembly 334 and receive sensor signals from sensors 312, and to output tactile signals according to a predefined sequence, algorithm, or process.

In a different, host-controlled embodiment, host computer 14 can provide low-level force commands over bus 20, which are directly transmitted to the actuator assembly 54 via microprocessor 310 or other (e.g. simpler) circuitry. Host computer 14 thus directly controls and processes all signals to and from the device 12, e.g. the host computer directly controls the forces output by actuator assembly 54 and directly receives sensor signals from sensors 312 and input devices 318. This embodiment may be desirable to reduce the cost of the haptic feedback device yet further, since no complex local microprocessor 310 or other processing circuitry need be included in the mouse. Furthermore, since one actuator is used with forces not provided in the primary sensed degrees of freedom, the local control of forces by microprocessor 310 may not be necessary in the present invention to provide the desired quality of forces due to their simpler nature.

In the simplest host control embodiment, the signal from the host to the device can be a single bit that indicates whether to pulse the actuator at a predefined frequency and magnitude. In a more complex embodiment, the signal from the host could include a magnitude, giving the strength of the desired pulse. In yet a more complex embodiment, the signal can include a direction, giving both a magnitude and a sense for the pulse. In still a more complex embodiment, a local processor can be used to receive a simple command from the host that indicates a desired force value to apply over time. The microprocessor then outputs the force value for the specified time period based on the one command, thereby reducing the communication load that must pass between host and device. In an even more complex embodiment, a high-level command with tactile sensation parameters can be passed to the local processor on the device which can then apply the full sensation independent of host intervention. Such an embodiment allows for the greatest reduction of communication load. Finally, a combination of numerous methods described above can be used for a single mouse device 12.

Local memory 322, such as RAM and/or ROM, is preferably coupled to microprocessor 310 in mouse 12 to store instructions for microprocessor 310 and store temporary and other data. For example, force profiles can be stored in memory 322, such has a sequence of stored force values that can be output by the microprocessor, or a look-up table of force values to be output based on the current position of the user object. In addition, a local clock 324 can be coupled to the microprocessor 310 to provide timing data, similar to the system clock of host computer 12; the timing data might be required, for example, to compute forces output by actuator assembly 54 (e.g., forces dependent on calculated velocities or other time dependent factors). In embodiments using the USB communication interface, timing data for microprocessor 310 can be a alternatively retrieved from the USB signal.

For example, host computer 14 can send a "spatial representation" to the local microprocessor 310, which is data describing the locations of some or all the graphical objects displayed in a GUI or other graphical environment which are associate d with forces and the types/characteristics of these graphical objects. The microprocessor can store such a spatial representation in local memory 322, and thus will be able to determine interactions between the user object and graphical objects (such as the rigid surface) independently of the host computer.

In addition, the microprocessor can be provided with the necessary instructions or data to check sensor readings, determine cursor and target positions, and determine output forces independently of host computer 14. The host could implement program functions (such as displaying images) when appropriate, and synchronization commands can be communicated between the microprocessor and host 14 to correlate the microprocessor and host processes. Also, the local memory can store predetermined force sensations for the microprocessor that are to be associated with particular types of graphical objects. Alternatively, the computer 14 can directly send force feedback signals to the device 12 to generate tactile sensations.

Sensors 312 sense the position or motion of the device and/or one or more manipulandums and provides signals to microprocessor 310 (or host 14) including information representative of the position or motion. Sensors suitable for detecting planar motion of a mouse include digital optical encoders, optical sensor systems, linear optical encoders, potentiometers, optical sensors, velocity sensors, acceleration sensors, strain gauge, or other types of sensors can also be used, and either relative or absolute sensors can be provided. Optional sensor interface 314 can be used to convert sensor signals to signals that can be interpreted by the microprocessor 310 and/or host computer system 14, as is well known to those skilled in the art.

One or more actuator assemblies 334 transmit forces to the housing of the device as described above in response to signals received from microprocessor 310 and/or host computer 14. Actuator assembly 334 is provided to generate inertial forces by moving an inertial mass, and/or contact forces by moving a contact member if desired, as described in detail above.

The actuator described herein has the ability to apply short duration force sensation on the handle or housing of the device with respect to an inertial mass. This short duration force sensation is described herein as a "pulse." In progressively more advanced embodiments, the magnitude of the "pulse" can be controlled; the sense of the "pulse" can be controlled, either positive or negative biased; a "periodic force sensation" can be applied on the handle of the mouse with respect to the inertial mass, where the periodic sensation can have a magnitude and a frequency, e.g. a sine wave; the periodic sensation can be selectable among a sine wave, square wave, saw-toothed-up wave, saw-toothed-down, and triangle wave; an envelope can be applied to the period signal, allowing for variation in magnitude over time; and the resulting force signal can be "impulse wave shaped" as described in U.S. Pat. No. 5,959,613. There are two ways the period sensations can be communicated from the host to the device. The wave forms can be "streamed" as described in U.S. Pat. 5,959,613 and pending patent application Ser. No. 09/687,744, both incorporated herein by reference in their entireties. Or the waveforms can be conveyed through high level commands that include parameters such as magnitude, frequency, and duration, as described in U.S. Pat. No. 5,734,373. These control schemes can also apply when providing contact forces using a moveable member; for example, a pulse can be simply moving a cover portion to momentarily contact the user's hand. The cover potion can also be moved according to an open-loop position control scheme, where a commanded output force magnitude overcomes the centering spring force of the system to produce a desired position or displacement of a cover portion or other contact element in its degree of freedom. A pulse command signal can also be used in those embodiments outputting both inertial and contact forces to move both the inertial mass and the contact member to provide simultaneous pulse sensations; or, the inertial mass can be controlled to output one sensation and the contact member can be simultaneously controlled to output a different sensation, such as a pulse of a different duration or magnitude, a vibration of a different frequency, a texture of a different spacing, etc.

Because of power constraints in some embodiments, secondary actuators can be passive (i.e., it dissipates energy). The passive actuator can be a brake, e.g., a brake employing a very low power substrate such as a magneto-rheological fluid. Alternatively, it can be a more traditional magnetic brake. For example, the passive braking means can be employed through a frictional coupling between a mouse housing and a table surface. For example, a friction roller in the mouse housing base can engage the table surface. The roller can spin freely when the mouse is moved by the user so long as the passive brake is not engaged. When the brake is engaged, the user can feel the passive resistance to motion of the mouse (in one or two of the planar degrees of freedom of the mouse). The passive resistance can allow additional feel sensations that supplement the "pulse" and "vibration" sensations described above (described with reference to FIG. 14). A different embodiment is described in U.S. Pat. No. 6,166,723, incorporated herein by reference in its entirety. Other types of devices, such as joysticks, steering wheels, trackballs, etc., can provide additional actuators as well.

Actuator interface 316 can be optionally connected between actuator assembly 334 and microprocessor 310 to convert signals from microprocessor 310 into signals appropriate to drive actuator assembly 54. Interface 516 can include power amplifiers, switches, digital to analog controllers (DACs), analog to digital controllers (ADCs), and other components, as is well known to those skilled in the art. It should be noted that circuitry should be provided to allow the actuator to be driven in two directions, since the preferred embodiment does not allow full revolutions of the actuator shaft, as described above. Circuitry for such bi-directional (harmonic) operation are well known to those skilled in the art and are also described in copending U.S. patent application Ser. No. 09/608,125, incorporated herein by reference in its entirety.

Other input devices 318 are included in device 12 and send input signals to microprocessor 310 or to host 14 when manipulated by the user. Such input devices include buttons 16 and can include additional buttons, dials, switches, scroll wheels, or other controls or mechanisms.

Power supply 320 can optionally be included in device 12 coupled to actuator interface 316 and/or actuator assembly 334 to provide electrical power to the actuator, or be provided as a separate component. Alternatively, and more preferably, power can be drawn from a power supply separate from device 12, or power can be received across a USB or other bus. Also, received power can be stored and regulated by device 12 and thus used when needed to drive actuator assembly 54 or used in a supplementary fashion. Because of the limited power supply capabilities of USB, a power storage device may be required in the mouse device to ensure that peak forces can be applied (as described in U.S. Pat. No. 5,929,607, incorporated herein by reference). For example, power can be stored over time in a capacitor or battery and then immediately dissipated to provide a jolt sensation to the device. Alternatively, this technology can be employed in a wireless mouse, in which case battery power is used to drive the tactile actuator. In one embodiment, the battery can be charged by an electric generator on board the mouse, the generator driven by the user's motions of the device. For example, a mouse ball or cylinder can turn a frictional roller or shaft that is coupled to and recharges the generator.

A safety switch 332 can optionally be included to allow a user to deactivate actuator assembly 334 for safety reasons. If, at any time, the safety switch is deactivated (opened), power from power supply 320 is cut to actuator assembly 54 (or the actuator is otherwise disabled) as long as the safety switch is opened. Embodiments include an optical switch, an electrostatic contact switch, a button or trigger, a hand weight safety switch, etc.

A variety of tactile sensations which can be output on the interface device using the inventions disclosed herein are described in U.S. application Ser. Nos. 09/570,361 and 09/504,201, and U.S. Pat. Nos. 5,734,373, 6,211,861, 6,169,540, and 6,184,868, all incorporated herein by reference.

While this invention has been described in terms of several preferred embodiments, it is contemplated that alterations, permutations and equivalents thereof will become apparent to those skilled in the art upon a reading of the specification and study of the drawings. For example, many different embodiments of haptic feedback devices can be used to output the tactile sensations described herein, including joysticks, steering wheels, gamepads, and remote controls. Furthermore, certain terminology has been used for the purposes of descriptive clarity, and not to limit the present invention.

What is claimed is:

1. An apparatus comprising:
    a housing;
    a sensor configured to detect motion of the housing in the two planar degrees of freedom; and
    an actuator assembly including a grounded coil, a flexure suspension and an inertial mass coupled to the flexure suspension, the actuator assembly coupled to the housing by the flexure suspension, the inertial mass configured to move substantially in a direction perpendicular to the two planar degrees of freedom to output haptic feedback to the housing when the actuator assembly is energized.

2. The apparatus of claim 1, wherein the flexure suspension includes an inner ring and an outer ring, the outer ring fixedly coupled to the housing, the inner ring coupled to and configured to move with the inertial mass.

3. The apparatus of claim 2, wherein the inner ring is coupled to said outer ring by at least one flexible member.

4. The apparatus of claim 1, wherein the flexure suspension includes an inner ring and an outer ring, one of the inner ring and outer ring being fixedly coupled to the housing, the other of the inner ring and outer ring being coupled to and configured to move with the inertial mass, the inner ring being coupled to the outer ring by at least one flexible member.

5. The apparatus of claim 1, wherein a moving portion of the flexure suspension is coupled to the inertial mass and is coupled to a grounded portion of the flexure suspension by at least one flex joint.

6. The apparatus of claim 1, further comprising a compliant layer configured to be displaced between at least a portion of the housing and a rigid support surface on which the housing is moved.

7. The apparatus of claim 2, wherein the inner ring and the outer ring are circular.

8. An apparatus, comprising:
    an object configured to be moveable in at least one degree of freedom;
    a sensor configured to detect motion of at least a portion the object in the at least one degree of freedom; and
    an actuator assembly including a grounded coil, a grounded flexure suspension and an inertial mass coupled to the flexure suspension, the actuator assembly coupled to the object by the flexure suspension, the inertial mass configured to move substantially in a direction perpendicular to the at least one degree of freedom to output haptic feedback when the actuator assembly is energized.

9. The apparatus of claim 8, wherein the actuator assembly outputs the haptic feedback through the object.

10. The apparatus of claim 8, further comprising a housing, the actuator assembly configured to output the haptic feedback through the housing.

11. The apparatus of claim 8, wherein the apparatus is configured to be held in at least one hand of a user when operated by the user.

12. The apparatus of claim 8, wherein the object includes a joystick handle.

13. The apparatus of claim 8, wherein the object includes a trackball.

14. The apparatus of claim 8, wherein the flexure suspension includes an inner ring and an outer ring.

15. The apparatus of claim 14, wherein the outer ring is affixed to the object and the inner ring is coupled and configured to move with the inertial mass.

16. The apparatus of claim 8, wherein the flexure suspension includes an inner ring and an outer ring, one of the inner ring and outer ring being fixedly coupled to the object and the other of the inner ring and outer ring being coupled to and configured to move with the inertial mass, the inner ring being coupled to the outer ring by at least one flexible member.

17. The apparatus of claim 8, wherein a moving portion of the flexure suspension is coupled to the inertial mass and is coupled to a grounded portion of the flexure suspension by at least one flex joint.

18. An apparatus comprising:
    a housing;
    a sensor configured to produce a plurality of control signals based on an input to at least a portion of the housing; and
    a plurality of actuator assemblies, each actuator assembly from the plurality of actuator assemblies including a flexure suspension and an inertial mass coupled to the flexure suspension, each actuator assembly from the plurality of actuator assemblies being coupled to the housing by its flexure suspension, each inertial mass configured to oscillate linearly along its own axis that is substantially orthogonal with the remaining axes to provide haptic feedback to the housing, the haptic feedback being output approximately along a single axis having a selected orientation, the selected orientation being associated with the plurality of control signals.

19. The apparatus of claim 18, wherein each actuator assembly from the plurality of actuator assemblies is uniquely associated with a control signal from the plurality of control signals.

20. The apparatus of claim 19, wherein each control signal from the plurality of control signals is at least one of in phase with and 180 degrees out of phase from the remaining control signals from the plurality of control signals.

21. The apparatus of claim 19, wherein the plurality of control signals is collectively associated with the selected orientation.

22. The apparatus of claim 19, wherein each control signal from the plurality of control signals is one of a sine wave and a square wave.

23. The apparatus of claim 19, wherein each control signal from the plurality of control signals is a sawtooth wave.

24. The apparatus of claim 18, wherein the inertial mass includes a pole piece disposed around a magnet, a grounded coil is disposed between the magnet and the pole piece, the inertial mass configured to oscillate when a current is applied to the coil.

25. The apparatus of claim 18, wherein the inertial mass includes a rotary actuator configured to move the inertial mass.

26. A method, comprising:

detecting a directional input to a housing; and outputting a directional haptic feedback to the housing based on the directional input, a plurality of actuator assemblies being configured to output the directional haptic feedback, each actuator assembly from the plurality of actuator assemblies including a grounded coil, a flexure suspension and an inertial mass coupled to the flexure suspension, each actuator assembly from the plurality of actuator assemblies being coupled to the housing by its flexure suspension, each actuator assembly from the plurality of actuator assemblies being configured to oscillate its inertial mass along an axis substantially orthogonal to the axis of each remaining inertial masses to provide the directional haptic feedback to the housing, the directional haptic feedback being output approximately along a single axis having a selected orientation.

27. The method of claim 26, wherein the actuator assembly from the plurality of actuator assemblies is uniquely associated with a control signal from a plurality of control signals, the plurality of control signals being associated with the directional input.

28. The method of claim 27, wherein each control signal from the plurality of control signals is one of in phase with and 180 degrees out of phase from the remaining control signals from the plurality of control signals.

29. The method of claim 27, wherein the plurality of control signals is collectively associated with the selected orientation.

30. The apparatus of claim 1, wherein the inertial mass includes a pole piece disposed around a magnet, the grounded coil is disposed between the magnet and the pole piece.

31. The apparatus of claim 8, wherein the inertial mass includes a pole piece disposed around a magnet, the grounded coil is disposed between the magnet and the pole piece.

* * * * *